US012416874B2

(12) United States Patent
Kitagawa et al.

(10) Patent No.: US 12,416,874 B2
(45) Date of Patent: Sep. 16, 2025

(54) TONER, DEVELOPER, TONER ACCOMMODATING UNIT, IMAGE FORMING APPARATUS, AND IMAGE FORMING METHOD

(71) Applicants: Yohichi Kitagawa, Shizuoka (JP); Kenji Komito, Tokyo (JP); Masayuki Ukigaya, Kanagawa (JP); Mitsuaki Hirose, Shizuoka (JP); Daisuke Inoue, Shizuoka (JP)

(72) Inventors: Yohichi Kitagawa, Shizuoka (JP); Kenji Komito, Tokyo (JP); Masayuki Ukigaya, Kanagawa (JP); Mitsuaki Hirose, Shizuoka (JP); Daisuke Inoue, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 801 days.

(21) Appl. No.: 17/501,076

(22) Filed: Oct. 14, 2021

(65) Prior Publication Data

US 2022/0155699 A1 May 19, 2022

(30) Foreign Application Priority Data

Nov. 13, 2020 (JP) ................................ 2020-189290

(51) Int. Cl.
*G03G 9/087* (2006.01)
*G03G 9/08* (2006.01)
*G03G 9/093* (2006.01)

(52) U.S. Cl.
CPC ....... *G03G 9/08797* (2013.01); *G03G 9/0819* (2013.01); *G03G 9/0827* (2013.01);
(Continued)

(58) Field of Classification Search
CPC ............ G03G 9/0827; G03G 9/09708; G03G 9/09725; G03G 9/09733
See application file for complete search history.

(56) References Cited

U.S. PATENT DOCUMENTS

2005/0026062 A1* 2/2005 Komoto ............ G03G 9/09716 430/108.5
2007/0297836 A1 12/2007 Kawasaki et al.
(Continued)

FOREIGN PATENT DOCUMENTS

EP 1515193 A2 * 3/2005 ............ G03G 9/081
JP 9-166919 6/1997
(Continued)

*Primary Examiner* — Peter L Vajda
(74) *Attorney, Agent, or Firm* — Grüneberg and Myers PLLC

(57) ABSTRACT

A toner is provided. The toner comprises toner particles each comprising a toner base particle and an external additive. The toner base particle comprises a binder resin and a colorant. The toner satisfies the following conditions (a) and (b):

(a) an average surface roughness Ra [nm] of the toner particles, detected by a scanning probe microscope analyzer, satisfies the following formula (1):

$$10 < Ra < 200 \quad \text{Formula (1); and}$$

(b) the external additive comprises coalesced particles being non-spherical secondary particles in which primary particles are coalesced with each other, the coalesced particles having a number average particle diameter of 50 nm or more.

16 Claims, 7 Drawing Sheets

(52) U.S. Cl.
CPC ..... *G03G 9/08755* (2013.01); *G03G 9/08795* (2013.01); *G03G 9/09314* (2013.01)

(56) References Cited

U.S. PATENT DOCUMENTS

| | | | | |
|---|---|---|---|---|
| 2008/0038649 | A1 | 2/2008 | Hirose et al. | |
| 2008/0124638 | A1 | 5/2008 | Hirose et al. | |
| 2008/0153018 | A1* | 6/2008 | Mikuriya | G03G 9/081 430/48 |
| 2008/0318142 | A1 | 12/2008 | Kawasaki et al. | |
| 2010/0150606 | A1 | 6/2010 | Tamoto et al. | |
| 2010/0260513 | A1 | 10/2010 | Kawasaki et al. | |
| 2010/0330475 | A1 | 12/2010 | Tamoto et al. | |
| 2011/0003244 | A1 | 1/2011 | Inoue et al. | |
| 2011/0059393 | A1 | 3/2011 | Tamoto et al. | |
| 2011/0065033 | A1 | 3/2011 | Uchinokura et al. | |
| 2011/0129773 | A1 | 6/2011 | Shu et al. | |
| 2011/0223532 | A1 | 9/2011 | Sugimoto et al. | |
| 2011/0262856 | A1 | 10/2011 | Sugimoto et al. | |
| 2011/0286777 | A1 | 11/2011 | Sugino et al. | |
| 2011/0305986 | A1 | 12/2011 | Ogawa et al. | |
| 2012/0064445 | A1 | 3/2012 | Kojima et al. | |
| 2012/0288299 | A1 | 11/2012 | Uchinokura et al. | |
| 2012/0321348 | A1 | 12/2012 | Toriu et al. | |
| 2013/0022371 | A1 | 1/2013 | Kusahara et al. | |
| 2013/0022902 | A1 | 1/2013 | Shimoyama et al. | |
| 2013/0059242 | A1 | 3/2013 | Asano et al. | |
| 2013/0059243 | A1 | 3/2013 | Hirose et al. | |
| 2013/0196260 | A1 | 8/2013 | Yoshida et al. | |
| 2013/0196261 | A1 | 8/2013 | Uchinokura et al. | |
| 2013/0243483 | A1 | 9/2013 | Hirose et al. | |
| 2013/0243488 | A1 | 9/2013 | Kojima et al. | |
| 2013/0244155 | A1 | 9/2013 | Satoh et al. | |
| 2013/0251401 | A1 | 9/2013 | Asano et al. | |
| 2015/0037720 | A1* | 2/2015 | Tsuda | G03G 9/09725 430/108.3 |
| 2017/0212435 | A1 | 7/2017 | Hirose et al. | |
| 2018/0052403 | A1 | 2/2018 | Inoue et al. | |
| 2018/0373198 | A1 | 12/2018 | Mizusawa et al. | |
| 2019/0011845 | A1 | 1/2019 | Toshine et al. | |
| 2019/0171122 | A1 | 6/2019 | Ukigaya et al. | |
| 2019/0271927 | A1 | 9/2019 | Inoue et al. | |
| 2020/0103775 | A1 | 4/2020 | Kitagawa et al. | |
| 2020/0233325 | A1 | 7/2020 | Nakamura et al. | |
| 2020/0301298 | A1* | 9/2020 | Inoue | G03G 9/0827 |
| 2021/0063916 | A1 | 3/2021 | Takei et al. | |
| 2021/0173337 | A1 | 6/2021 | Inoue et al. | |

FOREIGN PATENT DOCUMENTS

| | | |
|---|---|---|
| JP | 2006-098824 | 4/2006 |
| JP | 2007-078966 | 3/2007 |
| JP | 2008-298993 | 12/2008 |
| JP | 2011-095322 | 5/2011 |
| JP | 2014-178528 | 9/2014 |
| JP | 2017-058465 | 3/2017 |

* cited by examiner

TONER, DEVELOPER, TONER ACCOMMODATING UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2020-189290, filed on Nov. 13, 2020, in the Japan Patent Office, the entire disclosure of which is hereby incorporated by reference herein.

BACKGROUND

Technical Field

The present disclosure relates to a toner, a developer, a toner accommodating unit, an image forming apparatus, and an image forming method.

Description of the Related Art

In a conventional electrophotographic image forming apparatus, after a toner image on an image bearer has been transferred onto a transfer sheet or an intermediate transferor, unnecessary substances adhered to the surface of the image bearer, such as untransferred residual toner particles, are removed from the image bearer by a cleaner.

As the cleaner, a strip-shaped cleaning blade is generally well known because of its simple structure and excellent cleaning performance.

On the other hand, in response to a recent demand for higher image quality, the need for image forming apparatuses using a toner having a small particle diameter and a nearly spherical shape manufactured by a chemical method or the like has been increasing. Such a toner is more difficult to remove with a cleaning blade compared to a conventional toner manufactured by a kneading-pulverizing method. This is because the toner having a small particle diameter and a high sphericity slips through a slight gap formed between the cleaning blade and the image bearer.

Generally, the surface of toner is covered with an additive comprising, for example, inorganic particles such as silica and titanium oxide, to impart fluidity and chargeability to the toner. It is known that the additive is liberated from the toner which is dammed on the image bearer by the cleaning blade and supplied to the contact part between the cleaning blade and the image bearer, thus forming an accumulated layer of the additive. The liberated additive works as a lubricant between the cleaning blade and the image bearer.

SUMMARY

In accordance with some embodiments of the present invention, a toner is provided. The toner comprises toner particles each comprising a toner base particle and an external additive. The toner base particle comprises a binder resin and a colorant. The toner satisfies the following conditions (a) and (b):

(a) an average surface roughness Ra [nm] of the toner particles, detected by a scanning probe microscope analyzer, satisfies the following formula (1):

$$10<Ra<200 \quad \text{Formula (1); and}$$

(b) the external additive comprises coalesced particles being non-spherical secondary particles in which primary particles are coalesced with each other, the coalesced particles having a number average particle diameter of 50 nm or more.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
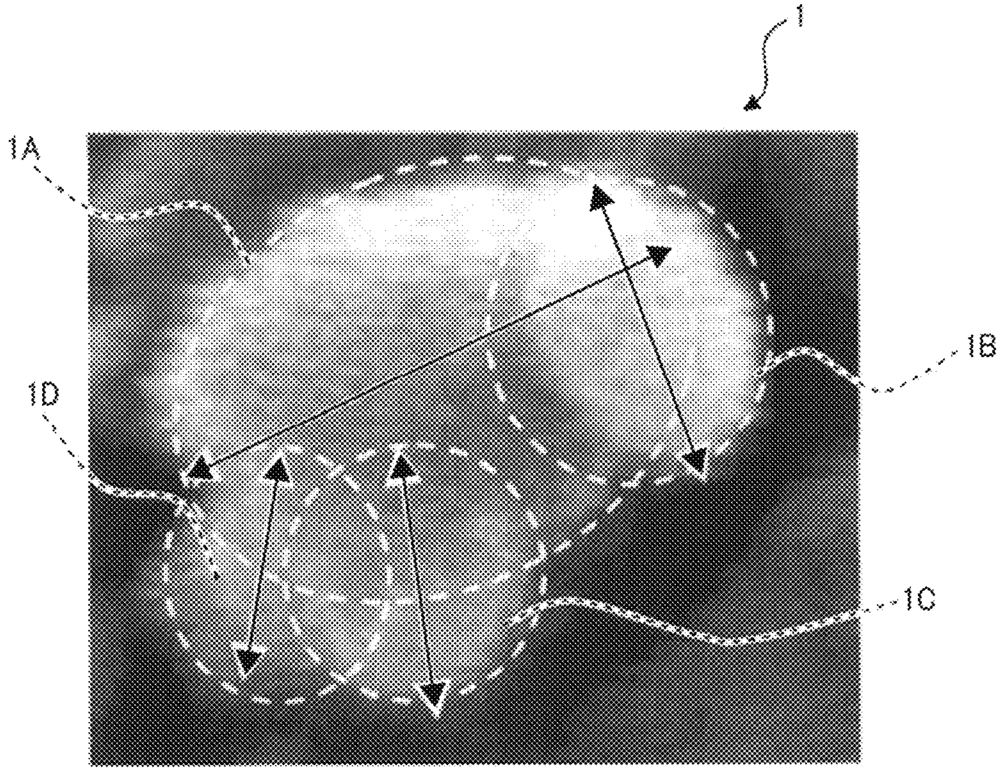
FIG. 1 is a photograph of a coalesced particle of an external additive of a toner according to an embodiment of the present invention, obtained with a scanning electron microscope (SEM)

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a toner having improved cleanability and filming resistance is provided.

In accordance with some embodiments of the present invention, the following items <1> to <9> are provided.

<1> A toner comprising:

toner particles each comprising:

a toner base particle comprising a binder resin and a colorant; and an external additive, wherein the toner satisfies the following conditions (a) and (b):

(a) an average surface roughness Ra [nm] of the toner particles, detected by a scanning probe microscope analyzer, satisfies the following formula (1):

$$10<Ra<200 \quad \text{Formula (1); and}$$

(b) the external additive comprises coalesced particles being non-spherical secondary particles in which primary particles are coalesced with each other, the coalesced particles having a number average particle diameter of 50 nm or more.

<2> The toner according to above <1>, wherein a liberation rate A [% by mass] of the external additive from the toner particles satisfies the following formula (2):

$$A<2.0 \quad \text{Formula (2).}$$

<3> The toner according to above <1> or <2>, wherein the average surface roughness Ra [nm] satisfies the following formula (3):

$$20<Ra<150 \quad \text{Formula (3).}$$

<4> The toner according to any one of above <1> to <3>, wherein the number average particle diameter of the coalesced particles is 200 nm or less.

<5> The toner according to any one of above <1> to <4>, wherein a proportion B [% by mass] of the external additive in the toner satisfies the following formula (4):

$$0.5 \leq B \leq 6.0 \quad \text{Formula (4).}$$

<6> A developer comprising the toner according to any one of above <1> to <5>.

<7> A toner accommodating unit comprising:

a container; and the toner according to any one of above <1> to <5> accommodated in the container.

<8> An image forming apparatus comprising:

an electrostatic latent image bearer;

an electrostatic latent image forming device configured to form an electrostatic latent image on the electrostatic latent image bearer;

a developing device containing the toner according to any one of above <1> to <5> or the developer according to above <6>, the developing device configured to develop the electrostatic latent image with the toner to form a visible image;

a transfer device configured to transfer the visible image onto a recording medium; and a fixing device configured to fix the visible image on the recording medium.

<9> An image forming method comprising:

forming an electrostatic latent image on an electrostatic latent image bearer;

developing the electrostatic latent image with the toner according to any one of above <1> to <5> or the developer according to above <6> to form a visible image;

transferring the visible image onto a recording medium; and fixing the visible image on the recording medium.

The toner according to an embodiment of the present invention comprises toner particles each comprising a toner base particle and an external additive. The toner base particle comprises a binder resin and a colorant.

The toner satisfies the following conditions (a) and (b).

(a) An average surface roughness Ra [nm] of the toner particles, detected by a scanning probe microscope (SPM) analyzer, satisfies the following formula (1).

$$10<Ra<200 \quad \text{Formula (1)}$$

(b) The external additive comprises coalesced particles being non-spherical secondary particles in which primary particles are coalesced with each other, and the coalesced particles have a number average particle diameter of 50 nm or more.

As described above, the average surface roughness Ra [nm] of the toner particles, detected by an SPM analyzer, satisfies the following formula (1).

$$10<Ra<200 \quad \text{Formula (1)}$$

The average surface roughness Ra [nm] of the toner particles represents the smoothness of the surfaces of the toner particles. Generally, when the average surface roughness of the toner particles is large, the coating efficiency with the external additive is low, and the spacer effect is low. Therefore, the contact frequency between the toner particles and between the toner particle and a blade is high, and the cleanability is low. When the average surface roughness Ra [nm] of the toner particles satisfies 10<Ra<200, the coating efficiency with the external additive is improved, and the external additive sufficiently exhibits the spacer effect, whereby the cleanability is improved.

When the average surface roughness Ra [nm] is 10 nm or less, the sphericity is high, and the toner particles pass through a slight gap formed between a cleaning blade and an image bearer to cause defective cleaning. When the average surface roughness Ra [nm] is 200 nm or more, the coating efficiency with the external additive is low, and the spacer effect is low, thereby causing defective cleaning.

More preferably, the average surface roughness Ra [nm] of the toner particles satisfies 20<Ra<150. In this case, the toner particles have irregular shapes which are required to be scraped off by the cleaning blade. In addition, the coating efficiency with the external additive is more improved, and the heat-resistant storage stability, durability, and cleanability are more improved The external additive contained in the toner of the present embodiment comprises at least coalesced particles. The coalesced particles are non-spherical secondary particles in which primary particles are coalesced with each other, and have a number average particle diameter of 50 nm or more.

The external additive having a number average particle diameter of 50 nm or more exhibits a spacer effect. The external additive being non-spherical increases the number of contact points between the toner base particles and the external additive and decreases the amount of the external additive liberated from the toner base particles, thereby suppressing contamination of (e.g., occurrence of filming on) an image bearer.

When the number average particle diameter of the external additive is less than 50 nm, the spacer effect of the external additive is lowered, causing defective cleaning. When the external additive is spherical, the number of contact points between the toner base particles and the external additive is small, and the external additive is easily liberated from the toner base particles, thereby causing contamination of (e.g., occurrence of filming on) an image bearer.

Hereinafter, components of the toner, a carrier, a method for producing the toner, an image forming apparatus, and an image forming method are described.

Toner

Toner Base Particles

The toner base particles contain at least a binder resin and a colorant, and optionally contain other components as needed.

Preferably, the toner base particles are prepared by dissolving or dispersing at least a binder resin and a colorant in an organic solvent, adding the resulting solution or dispersion to an aqueous phase, and removing the organic solvent from the resulting dispersion liquid. More preferably, the toner base particles are prepared by dissolving or dispersing at least a binder resin precursor and a colorant in an organic solvent, adding the resulting solution or dispersion to an aqueous phase to subject the binder resin precursor to a cross-linking or elongation reaction, and removing the organic solvent from the resulting dispersion liquid.

The toner base particles contain a polyester, preferably a non-linear amorphous polyester A, and more preferably a crystalline polyester C, as the binder resin.

THF-insoluble matter in the toner base particles preferably contains the non-linear amorphous polyester A or the crystalline polyester C.

The amorphous polyester resin can be obtained from a polyol component and a polycarboxylic acid component such as polycarboxylic acid, polycarboxylic acid anhydride, and polycarboxylic acid ester.

In the present disclosure, the amorphous polyester resin refers to a resin obtained from a polyol component and a polycarboxylic acid component such as polycarboxylic acid, polycarboxylic acid anhydride, and polycarboxylic acid ester. Modified polyester resins, such as a prepolymer (to be described later) and a resin obtained by a cross-linking and/or elongation reaction of the prepolymer, do not fall within the amorphous polyester resin of the present disclosure.

Specific examples of the polyol component include, but are not limited to, alkylene (C2-C3) oxide adducts (with an average addition molar number of 1 to 10) of bisphenol A such as polyoxypropylene(2.2)-2,2-bis(4-hydroxyphenyl) propane and polyoxyethylene(2.2)-2,2-bis(4-hydroxyphenyl)propane; and ethylene glycol, propylene glycol, neopentyl glycol, glycerin, pentaerythritol, trimethylolpropane, hydrogenated bisphenol A, sorbitol, and alkylene (C2-C3) oxide adducts (with an average addition molar number of 1 to 10) of these compounds. Each of these can be used alone or in combination with others.

Specific examples of the polycarboxylic acid component include, but are not limited to, dicarboxylic acids such as adipic acid, phthalic acid, isophthalic acid, terephthalic acid, fumaric acid, and maleic acid; succinic acids substituted with an alkyl group having 1 to 20 carbon atoms or an alkenyl group having 2 to 20 carbon atoms, such as dodecenyl succinic acid and octyl succinic acid; trimellitic acid and pyromellitic acid; and anhydrides and alkyl (C1-C8) esters of the above acids. Each of these can be used alone or in combination with others.

It is preferable that the amorphous polyester resin be at least partially compatibilized with a prepolymer (to be described later) and a resin obtained by a cross-linking and/or elongation reaction of the prepolymer. Such a compatibilization makes improvements in low-temperature fixability and high-temperature offset resistance. Therefore, it is preferable that polyol component and the polycarboxylic acid component constituting the amorphous polyester resin and those constituting the prepolymer be similar in composition.

The molecular weight of the amorphous polyester resin is not particularly limited and can be suitably selected to suit to a particular application. However, when the molecular weight is too low, heat-resistant storage stability and durability (i.e., resistance to stresses, such as that caused by stirring in a developing device) of the toner may be poor. When the molecular weight is too high, viscoelasticity of the toner at melting is too high, and low-temperature fixability may be poor. Therefore, it is preferable that the weight average molecular weight (Mw) is from 2,500 to 10,000, the number average molecular weight (Mn) is from 1,000 to 4,000, and Mw/Mn is from 1.0 to 4.0, when measured by gel permeation chromatography (GPC).

The acid value of the amorphous polyester resin is not particularly limited and can be suitably selected to suit to a particular application, but is preferably from 1 to 50 mgKOH/g, more preferably from 5 to 30 mgKOH/g. When the acid value is 1 mgKOH/g or higher, the toner becomes more negatively-chargeable and more compatible with paper when being fixed thereon, improving low-temperature fixability. When the acid value is 50 mgKOH/g or lower, charge stability, particularly charge stability against environmental fluctuation does not decrease.

The hydroxyl value of the amorphous polyester resin is not particularly limited and can be suitably selected to suit to a particular application, but is preferably 5 mgKOH/g or higher.

The glass transition temperature (Tg) of the amorphous polyester resin is not particularly limited and can be suitably selected to suit to a particular application. However, when the Tg is too low, heat-resistant storage stability and durability (i.e., resistance to stresses, such as that caused by stirring in a developing device) of the toner may be poor. When the Tg is too high, viscoelasticity of the toner at melting is too high, and low-temperature fixability may be poor. Therefore, the glass transition temperature (Tg) is preferably from 40° C. to 70° C., and more preferably from 45° C. to 60° C.

The amount of the amorphous polyester resin in the toner is not particularly limited and can be suitably selected to suit to a particular application, but is preferably from 50 to 95 parts by mass, more preferably from 60 to 90 parts by mass, in 100 parts by mass of the toner. When the amount is less than 50 parts by mass, dispersibility of colorants and release agents in the toner may deteriorate, and image fog or disturbance may be caused. When the amount is greater than 95 parts by mass, the amount of the crystalline polyester resin is so small that low-temperature fixability may be poor. When the amount is within the preferred range, high image quality, high stability, and low-temperature fixability are all advantageously achieved.

The molecular structure of the amorphous polyester resin can be determined by, for example, solution or solid NMR (nuclear magnetic resonance), X-ray diffractometry, GC/MS (gas chromatography-mass spectroscopy), LC/MS (liquid chromatography-mass spectroscopy), or IR (infrared spectroscopy). For example, IR can simply detect an amorphous polyester resin as a substance showing no absorption peak based on δCH (out-of-plane bending vibration) of olefin at 965±10 $cm^{-1}$ and 990±10 $cm^{-1}$ in an infrared absorption spectrum.

Crystalline Polyester Resin

The crystalline polyester resin has a structural unit derived from a saturated aliphatic diol.

Preferred examples of the saturated aliphatic diol include an alcohol component containing a straight-chain aliphatic diol having 2 to 8 carbon atoms. Such a crystalline polyester resin can be finely and uniformly dispersed inside the toner. As a result, the crystalline polyester resin is prevented from filming, the toner is improved in stress resistance, and low-temperature fixability of the toner is achieved.

The crystalline polyester resin has a heat melting property such that the viscosity rapidly decreases at around the fixing start temperature due to its high crystallinity. By containing the crystalline polyester resin having such a property, the toner maintains good storage stability below the melting start temperature due to the crystallinity of the crystalline polyester resin and undergoes a rapid decrease in viscosity ("sharply-melting property") at the melting start temperature for fixing. Thus, the toner exhibits excellent heat-resistant storage stability and low-temperature fixability. Such a toner also exhibits a wide releasable range (i.e., the difference between the lower-limit fixable temperature and the hot offset generating temperature).

The crystalline polyester resin can be obtained from a polyol component and a polycarboxylic acid component such as polycarboxylic acid, polycarboxylic acid anhydride, and polycarboxylic acid ester.

In the present disclosure, the crystalline polyester resin refers to a resin obtained from a polyol component and a polycarboxylic acid component such as polycarboxylic acid, polycarboxylic acid anhydride, and polycarboxylic acid ester. Modified crystalline polyester resins, such as a prepolymer (to be described later) and a resin obtained by a cross-linking and/or elongation reaction of the prepolymer, do not fall within the crystalline polyester resin of the present disclosure.

Polyol Component

The polyol component is not particularly limited and can be suitably selected to suit to a particular application. Examples thereof include, but are not limited to, diols and trivalent or higher alcohols.

Examples of the diols include, but are not limited to, saturated aliphatic diols. Examples of the saturated aliphatic diols include, but are not limited to, straight-chain saturated aliphatic diols and branched saturated aliphatic diols. In particular, straight-chain saturated aliphatic diols are preferred, and straight-chain saturated aliphatic diols having 2 to 8 carbon atoms are more preferred. The branched saturated aliphatic diols may lower crystallinity of the crystalline polyester resin and may further lower the melting point thereof. When the number of carbon atoms in the main chain is less than 2, the melting temperature becomes high in the case of polycondensation with an aromatic dicarboxylic acid, and it may be difficult to fix the toner at low temperatures. Those containing more than 8 carbon atoms are not easily available. Thus, the number of carbon atoms is preferably 8 or less.

Specific examples of the saturated aliphatic diols include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol. Among these, ethylene glycol, 1,3-propanediol, 1,4-butanediol, 1,5-pentanediol, and 1,6-hexanediol are preferred for the crystalline polyester resin having high crystallinity and sharply-melting property.

Specific examples of the trivalent or higher alcohols include, but are not limited to, glycerin, trimethylolethane, trimethylolpropane, and pentaerythritol.

Each of these may be used alone or in combination with others.

Polycarboxylic Acid Component

As the polycarboxylic acid, sebacic acid is used. Other divalent carboxylic acids and trivalent or higher carboxylic acids may be used in combination according to a particular application.

Specific examples of the divalent carboxylic acids include, but are not limited to: saturated aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids such as diprotic acids such as phthalic acid, isophthalic acid, terephthalic acid, naphthalene-2,6-dicarboxylic acid, malonic acid, and mesaconic acid; and anhydrides and lower alkyl esters thereof.

Specific examples of the trivalent or higher carboxylic acids include, but are not limited to, 1,2,4-benzenetricarboxylic acid, 1,2,5-benzenetricarboxylic acid, 1,2,4-naphthalenetricarboxylic acid, and anhydrides and lower alkyl esters thereof.

The polycarboxylic acid component may further include a dicarboxylic acid component having sulfo group, other than the above-described saturated aliphatic dicarboxylic acids and aromatic dicarboxylic acids. In addition, the polycarboxylic acid component may further include a dicarboxylic acid having a double bond, other than the above-described saturated aliphatic dicarboxylic acids and aromatic dicarboxylic acids.

Each of these may be used alone or in combination with others.

The melting point of the crystalline polyester resin is not particularly limited and can be suitably selected to suit to a particular application, but is preferably 60° C. or higher and lower than 80° C. When the melting point is lower than 60° C., the crystalline polyester resin is likely to melt at low temperatures, and heat-resistant storage stability of the toner may deteriorate. When the melting point is 80° C. or higher, the crystalline polyester resin melts insufficiently upon application of heat at the time of fixing the toner, and low-temperature fixability may deteriorate.

The melting point can be determined from an endothermic peak value in a DSC chart measured by a differential scanning calorimeter (DSC).

The molecular weight of the crystalline polyester resin is not particularly limited and can be suitably selected to suit to a particular application. As the molecular weight distribution becomes narrower and the molecular weight becomes lower, low-temperature fixability improves. As the amount of low-molecular-weight components increases, heat-resistant storage stability deteriorates. In view of this, preferably, ortho-dichlorobenzene-soluble matter in the crystalline polyester resin has a weight average molecular weight (Mw) of from 3,000 to 30,000, a number average molecular weight (Mn) of from 1,000 to 10,000, and a ratio Mw/Mn of from 1.0 to 10, when measured by GPC (gel permeation chromatography).

The acid value of the crystalline polyester resin is not particularly limited and can be suitably selected to suit to a particular application, but is preferably 5 mgKOH/g or more, more preferably 10 mgKOH/g or more, for achieving a desired level of low-temperature fixability in terms of affinity for paper. On the other hand, for improving high-temperature offset resistance, the acid value is preferably 45 mgKOH/g or less.

The hydroxyl value of the crystalline polyester resin is not particularly limited and can be suitably selected to suit to a particular application, but is preferably from 0 to 50 mgKOH/g, more preferably from 5 to 50 mgKOH/g, for achieving a desired level of low-temperature fixability and a good level of chargeability.

The molecular structure of the crystalline polyester resin can be determined by, for example, solution or solid NMR (nuclear magnetic resonance), X-ray diffractometry, GC/MS (gas chromatography-mass spectroscopy), LC/MS (liquid chromatography-mass spectroscopy), or JR (infrared spectroscopy). For example, JR can simply detect a crystalline polyester resin as a substance showing an absorption peak based on SCH (out-of-plane bending vibration) of olefin at 965±10 $cm^{-1}$ or 990±10 $cm^{-1}$ in an infrared absorption spectrum.

The amount of the crystalline polyester resin in the toner is not particularly limited and can be suitably selected to suit to a particular application, but is preferably from 2 to 20 parts by mass, more preferably from 5 to 15 parts by mass, in 100 parts by mass of the toner. When the amount is less than 2 parts by mass, sharply-melting property of the crystalline polyester resin is insufficient, and low-temperature fixability may deteriorate. When the amount is more than 20 parts by mass, heat-resistant storage stability may be poor, and image fog may easily occur. When the amount is within the preferred range, high image quality, high stability, and low-temperature fixability are all advantageously achieved.

Other Components

Other components are not particularly limited and can be suitably selected to suit to a particular application. Examples thereof include, but are not limited to, a release agent, a colorant, a polymer having a site reactive with an active-hydrogen-group-containing compound, an active-hydrogen-group-containing compound, a charge controlling agent, a fluidity improving agent, a cleanability improving agent, and a magnetic material.

Release Agent

The release agent is not particularly limited and may be appropriately selected from known materials.

Specific examples of the release agent include, but are not limited to, waxes, particularly natural waxes such as plant waxes (e.g., carnauba wax, cotton wax, sumac wax, rice wax), animal waxes (e.g., beeswax, lanolin), mineral waxes (e.g., ozokerite, ceresin), and petroleum waxes (e.g., paraffin wax, microcrystalline wax, petrolatum wax).

Specific examples of the release agent further include, but are not limited to, synthetic hydrocarbon waxes (e.g., Fischer-Tropsch wax, polyethylene, polypropylene) and synthetic waxes (e.g., ester, ketone, ether).

Furthermore, the following materials may also be used: fatty acid amide compounds such as 12-hydroxystearic acid amide, stearic acid amide, phthalic anhydride imide, and chlorinated hydrocarbon; homopolymers and copolymers of polyacrylates (e.g., poly-n-stearyl methacrylate, poly-n-lauryl methacrylate), which are low-molecular-weight crystalline polymers, such as copolymer of n-stearyl acrylate and ethyl methacrylate; and crystalline polymers having a long alkyl group on a side chain.

Among these, hydrocarbon waxes such as paraffin wax, micro-crystalline wax, Fischer-Tropsch wax, polyethylene wax, and polypropylene wax are preferred.

The melting point of the release agent is not particularly limited and can be suitably selected to suit to a particular application, but is preferably 60° C. or higher and lower than 95° C.

More preferably, the release agent is a hydrocarbon wax having a melting point of 60° C. or higher and lower than 95° C. Such a release agent can effectively act at the interface between a fixing roller and the toner, thereby improving high-temperature offset resistance without applying another release agent such as an oil to the fixing roller.

In particular, hydrocarbon waxes are preferred because they have almost no compatibility with the crystalline polyester resin and able to function independently from each other. Therefore, either the softening effect of the crystalline polyester resin as a binder resin or the offset property of the release agent is not impaired.

When the melting point of the release agent is lower than 60° C., the release agent is easily melted at low temperatures, and the heat-resistant storage stability of the toner may be poor. When the melting point of the release agent is 95° C. or higher, the release agent melts insufficiently upon application of heat at the time of fixing the toner, and offset resistance may be poor.

The amount of the release agent in the toner is not particularly limited and can be suitably selected to suit to a particular application. Preferably, the amount of the release agent in 100 parts by mass of the toner is from 2 to 10 parts by mass, more preferably from 3 to 8 parts by mass. When the amount is less than 2 parts by mass, high-temperature offset resistance at the time of fixing and low-temperature fixability may be poor. When the amount is more than 10 parts by mass, heat-resistant storage stability may be poor and image fog may occur. When the amount is within the preferred range, image quality and fixing stability are advantageously improved.

Colorant

The colorant is not particularly limited and can be suitably selected to suit to a particular application. Specific examples thereof include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A. RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G. Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarin Lake, Thioindigo Red B, Thioindigo Maroon, Oil Red, Quinacridone Red, Pyrazolone Red, polyazo red, Chrome Vermilion, Benzidine Orange, perinone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone.

The amount of the colorant in the toner is not particularly limited and can be suitably selected to suit to a particular application. Preferably, the amount of the colorant in 100 parts by mass of the toner is from 1 to 15 parts by mass, more preferably from 3 to 10 parts by mass.

The colorant can be combined with a resin to be used as a master batch. Examples of the resin to be used for manufacturing the master batch or kneaded with the master batch include, but are not limited to: hybrid resins, and polymers of styrene or substitutes thereof, such as polystyrene, poly p-chlorostyrene, and polyvinyl toluene; styrene-based copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleate copolymer; and polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Each of these can be used alone or in combination with others.

The master batch can be obtained by mixing and kneading the resin and the colorant while applying a high shearing force thereto. To increase the interaction between the colorant and the resin, an organic solvent may be used. More specifically, the maser batch can be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. Preferably, the mixing and kneading is performed by a high shearing dispersing device such as a three roll mill.

Polymer Having Site Reactive with Active-Hydrogen-Group-Containing Compound (Prepolymer)

The polymer having a site reactive with an active-hydrogen-group-containing compound (hereinafter "prepolymer") is not particularly limited and can be suitably selected to suit to a particular application. Specific examples thereof include, but are not limited to, polyol resins, polyacrylic resins, polyester resins, epoxy resins, and derivatives thereof. Each of these can be used alone or in combination with others. Among these, polyester resins are preferred for their high flowability at the time of melting and transparency.

Specific examples of the site reactive with an active-hydrogen-group-containing compound contained in the prepolymer include, but are not limited to, isocyanate group, epoxy group, carboxyl group, and a functional group represented by the chemical formula —COCl. Each of these can be used alone or in combination with others. Among these, isocyanate group is preferred.

The prepolymer is not particularly limited and can be suitably selected to suit to a particular application. In particular, a polyester resin capable of forming urea bonds, such as that having an isocyanate group, is preferred because the molecular weight of high-molecular-weight components thereof is easily adjustable, and such a resin is capable of providing dry toner having excellent separability and oilless low-temperature fixability even in a fixing system equipped with no oil applicator for applying oil to a heat-fixing member.

Active-Hydrogen-Group-Containing Compound

The active-hydrogen-group-containing compound acts as an elongating agent or a cross-linking agent when the polymer having a site reactive with an active-hydrogen-group-containing compound undergoes an elongation reaction or a cross-linking reaction in an aqueous medium.

The active hydrogen group is not particularly limited and can be suitably selected to suit to a particular application. Examples thereof include, but are not limited to, hydroxyl groups (e.g., alcoholic hydroxyl group, phenolic hydroxyl group), amino group, carboxyl group, and mercapto group. Each of these can be used alone or in combination with others.

The active-hydrogen-group-containing compound is not particularly limited and can be suitably selected to suit to a particular application. In a case in which the polymer having a site reactive with an active-hydrogen-group-containing compound is a polyester resin having an isocyanate group, an amine is preferably used as the active-hydrogen-group-containing compound because the amine is capable of making the molecular weight of the polyester resin higher through an elongation reaction or a cross-linking reaction. The amine is not particularly limited and can be suitably selected to suit to a particular application. Specific examples thereof include, but are not limited to, diamines, trivalent or higher amines, amino alcohols, amino mercaptans, amino acids, and blocked amines in which the amino group in any of these is blocked. Each of these can be used alone or in combination with others.

Among these, a diamine alone and a mixture of a diamine with a small amount of a trivalent or higher amine are preferred.

The diamine is not particularly limited and can be suitably selected to suit to a particular application. Examples thereof include, but are not limited to, aromatic diamines, alicyclic diamines, and aliphatic diamines. The aromatic diamines are not particularly limited and can be suitably selected to suit to a particular application. Examples thereof include, but are not limited to, phenylenediamine, diethyltoluenediamine, and 4,4'-diaminodiphenylmethane. The alicyclic diamines are not particularly limited and can be suitably selected to suit to a particular application. Examples thereof include, but are not limited to, 4,4'-diamino-3,3'-dimethyldicyclohexylmethane, diaminocyclohexane, and isophoronediamine. The aliphatic diamines are not particularly limited and can be suitably selected to suit to a particular application. Examples thereof include, but are not limited to, ethylenediamine, tetramethylenediamine, and hexamethylenediamine.

The trivalent or higher amines are not particularly limited and can be suitably selected to suit to a particular application. Examples thereof include, but are not limited to, diethylenetriamine and triethylenetetramine.

The amino alcohols are not particularly limited and can be suitably selected to suit to a particular application. Examples thereof include, but are not limited to, ethanolamine and hydroxyethylaniline.

The amino mercaptans are not particularly limited and can be suitably selected to suit to a particular application. Examples thereof include, but are not limited to, aminoethyl mercaptan and aminopropyl mercaptan.

The amino acids are not particularly limited and can be suitably selected to suit to a particular application. Examples thereof include, but are not limited to, aminopropionic acid and aminocaproic acid.

The amines in which the amino group is blocked are not particularly limited and can be suitably selected to suit to a particular application. Examples thereof include, but are not limited to, ketimine compounds obtained by blocking the amino group with a ketone such as acetone, methyl ethyl ketone, and methyl isobutyl ketone, and oxazoline compounds.

Polyester Resin Having Isocyanate Group

The polyester resin having an isocyanate group (hereinafter may be referred to as the "polyester prepolymer having an isocyanate group") is not particularly limited and can be suitably selected to suit to a particular application. Examples thereof include, but are not limited to, a reaction product of a polyisocyanate with a polyester resin having an active hydrogen group which is obtained by a poly condensation between a polyol and a polycarboxylic acid.

Polyol

The polyol is not particularly limited and can be suitably selected to suit to a particular application. Examples thereof include, but are not limited to, diols, trivalent or higher alcohols, and mixtures of diols with trivalent or higher alcohols. Each of these can be used alone or in combination with others.

Among these, a diol alone and a mixture of a diol with a small amount of a trivalent or higher alcohol are preferred.

The diols are not particularly limited and can be suitably selected to suit to a particular application. Specific examples thereof include, but are not limited to, alkylene glycols (e.g., ethylene glycol, 1,2-propylene glycol, 1,3-propylene glycol, 1,4-butanediol, 1,6-hexanediol); diols having an oxyalkylene group (e.g., diethylene glycol, triethylene glycol, dipropylene glycol, polyethylene glycol, polypropylene glycol, polytetramethylene glycol); alicyclic diols (e.g., 1,4-cyclohexanedimethanol, hydrogenated bisphenol A); alicyclic diols to which an alkylene oxide, such as ethylene oxide, propylene oxide, or butylene oxide, is adducted; bisphenols (e.g., bisphenol A, bisphenol F, bisphenol S); and bisphenols to which an alkylene oxide, such as ethylene oxide, propylene oxide, or butylene oxide, is adducted. The number of carbon atoms in the alkylene glycols is not particularly limited and can be suitably selected to suit to a particular application, but is preferably from 2 to 12.

Among these, alkylene glycols having 2 to 12 carbon atoms, and alkylene oxide adducts of bisphenols are preferred; and alkylene oxide adducts of bisphenols, and mixtures of alkylene oxide adducts of bisphenols with alkylene glycols having 2 to 12 carbon atoms are more preferred.

The trivalent or higher alcohols are not particularly limited and can be suitably selected to suit to a particular application. Examples thereof include, but are not limited to, trivalent or higher aliphatic alcohols, trivalent or higher polyphenols, and alkylene oxide adducts of trivalent or higher polyphenols.

The trivalent or higher aliphatic alcohols are not particularly limited and can be suitably selected to suit to a particular application. Specific examples thereof include, but are not limited to, glycerin, trimethylolethane, trimethylolpropane, pentaerythritol, and sorbitol.

The trivalent or higher polyphenols are not particularly limited and can be suitably selected to suit to a particular application. Specific examples thereof include, but are not limited to, trisphenol PA, phenol novolac, and cresol novolac.

Specific examples of the alkylene oxide adducts of trivalent or higher polyphenols include, but are not limited to, alkylene oxide (e.g., ethylene oxide, propylene oxide, and butylene oxide) adducts of trivalent or higher polyphenols.

In a case in which the diol and the trivalent or higher alcohol are used in combination, the mass ratio of the trivalent or higher alcohol to the diol is not particularly limited and can be suitably selected to suit to a particular application, but is preferably from 0.01% to 10% by mass, and more preferably from 0.01% to 1% by mass.

Polycarboxylic Acid

The polycarboxylic acid is not particularly limited and can be suitably selected to suit to a particular application. Examples thereof include, but are not limited to, dicarboxylic acids, trivalent or higher carboxylic acids, and mixtures of dicarboxylic acids with trivalent or higher carboxylic acids. Each of these can be used alone or in combination with others.

Among these, a dicarboxylic acid alone and a mixture of a dicarboxylic acid with a small amount of a trivalent or higher polycarboxylic acid are preferred.

The dicarboxylic acids are not particularly limited and can be suitably selected to suit to a particular application. Specific examples thereof include, but are not limited to, divalent alkanoic acids, divalent alkenoic acids, and aromatic dicarboxylic acids.

The divalent alkanoic acids are not particularly limited and can be suitably selected to suit to a particular application. Specific examples thereof include, but are not limited to, succinic acid, adipic acid, and sebacic acid.

The divalent alkenoic acids are not particularly limited and can be suitably selected to suit to a particular application. Specific preferred examples thereof include, but are not limited to, divalent alkenoic acids having 4 to 20 carbon atoms. The divalent alkenoic acids having 4 to 20 carbon atoms are not particularly limited and can be suitably selected to suit to a particular application. Specific examples thereof include, but are not limited to, maleic acid and fumaric acid.

The aromatic dicarboxylic acids are not particularly limited and can be suitably selected to suit to a particular application. Specific preferred examples thereof include, but are not limited to, aromatic dicarboxylic acids having 8 to 20 carbon atoms. The aromatic dicarboxylic acids having 8 to 20 carbon atoms are not particularly limited and can be suitably selected to suit to a particular application. Specific examples thereof include, but are not limited to, phthalic acid, isophthalic acid, terephthalic acid, and naphthalenedicarboxylic acid.

The trivalent or higher carboxylic acids are not particularly limited and can be suitably selected to suit to a particular application. Examples thereof include, but are not limited to, trivalent or higher aromatic carboxylic acids.

The trivalent or higher aromatic carboxylic acids are not particularly limited and can be suitably selected to suit to a particular application. Specific preferred examples thereof include, but are not limited to, trivalent or higher aromatic carboxylic acids having 9 to 20 carbon atoms. The trivalent or higher aromatic carboxylic acids having 9 to 20 carbon atoms are not particularly limited and can be suitably selected to suit to a particular application. Specific examples thereof include, but are not limited to, trimellitic acid and pyromellitic acid.

Examples of the polycarboxylic acid further include acid anhydrides and lower alkyl esters of the dicarboxylic acids, the trivalent or higher carboxylic acids, and mixtures of the dicarboxylic acids with the trivalent or higher carboxylic acids.

The lower alkyl esters are not particularly limited and can be suitably selected to suit to a particular application. Specific examples thereof include, but are not limited to, methyl ester, ethyl ester, and isopropyl ester.

In a case in which the dicarboxylic acid and the trivalent or higher carboxylic acid are used in combination, the mass ratio of the trivalent or higher carboxylic acid to the dicarboxylic acid is not particularly limited and can be suitably selected to suit to a particular application, but is preferably from 0.01% to 10% by mass, and more preferably from 0.01% to 1% by mass.

At a polycondensation between the polyol and the polycarboxylic acid, the equivalent ratio of hydroxyl groups in the polyol to carboxyl groups in the polycarboxylic acid is not particularly limited and can be suitably selected to suit to a particular application, but is preferably from 1 to 2, more preferably from 1 to 1.5, and particularly preferably from 1.02 to 1.3.

The proportion of polyol-derived structural units in the polyester prepolymer having an isocyanate group is not particularly limited and can be suitably selected to suit to a particular application, but is preferably from 0.5% to 40% by mass, more preferably from 1% to 30% by mass, and particularly preferably from 2% to 20% by mass.

When the proportion is less than 0.5% by mass, high-temperature offset resistance may deteriorate, and it may be difficult to achieve both heat-resistant storage stability and low-temperature fixability of the toner at the same time. When the proportion is more than 40% by mass, low-temperature fixability may deteriorate.

Polyisocyanate

The polyisocyanate is not particularly limited and can be suitably selected to suit to a particular application. Specific examples thereof include, but are not limited to, aliphatic diisocyanates, alicyclic diisocyanates, aromatic diisocyanates, araliphatic diisocyanates, isocyanurates, and those blocked with a phenol derivative, oxime, or caprolactam.

The aliphatic diisocyanates are not particularly limited and can be suitably selected to suit to a particular application. Specific examples thereof include, but are not limited to, tetramethylene diisocyanate, hexamethylene diisocyanate, methyl 2,6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanates are not particularly limited and can be suitably selected to suit to a particular application. Specific examples thereof include, but are not limited to, isophorone diisocyanate and cyclohexylmethane diisocyanate.

The aromatic diisocyanates are not particularly limited and can be suitably selected to suit to a particular application. Specific examples thereof include, but are not limited to, tolylene diisocyanate, diisocyanatodiphenylmethane, 1,5-naphthylene diisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The araliphatic diisocyanates are not particularly limited and can be suitably selected to suit to a particular application. Specific examples thereof include, but are not limited to, α,α,α',α'-tetramethylxylylene diisocyanate.

The isocyanurates are not particularly limited and can be suitably selected to suit to a particular application. Specific examples thereof include, but are not limited to, tris(isocyanatoalkyl) isocyanurate and tris(isocyanatocycloalkyl) isocyanurate. Each of these can be used alone or in combination with others.

In a case in which the polyisocyanate is reacted with a polyester resin having a hydroxyl group, the equivalent ratio of isocyanate groups in the polyisocyanate to hydroxyl groups in the polyester resin is not particularly limited and can be suitably selected to suit to a particular application, but is preferably from 1 to 5, more preferably from 1.2 to 4, and particularly preferably from 1.5 to 3. When the equivalent ratio is less than 1, offset resistance may deteriorate. When the equivalent ratio is more than 5, low-temperature fixability may deteriorate.

The proportion of polyisocyanate-derived structural units in the polyester prepolymer having an isocyanate group is not particularly limited and can be suitably selected to suit to a particular application, but is preferably from 0.5% to 40% by mass, more preferably from 1% to 30% by mass, and particularly preferably from 2% to 20% by mass. When the proportion is less than 0.5% by mass, high-temperature offset resistance may deteriorate. When the proportion is more than 40% by mass, low-temperature fixability may deteriorate.

The average number of isocyanate groups included in one molecule of the polyester prepolymer having an isocyanate group is not particularly limited and can be suitably selected to suit to a particular application, but is preferably 1 or more, more preferably from 1.2 to 5, and particularly preferably from 1.5 to 4. When the average number is less than 1, the molecular weight of the urea-modified polyester resin becomes low, and high-temperature offset resistance may deteriorate.

The mass ratio of the polyester prepolymer having an isocyanate group to a polyester resin containing 50% by mol or more of propylene oxide adducts of bisphenols in the polyol component and having specific hydroxyl value and acid value is not particularly limited and can be suitably selected to suit to a particular application, but is preferably from {(less than 5)/(more than 95)} to {(more than 25)/(less than 75)}, and more preferably from 10/90 to 25/75. When the mass ratio is less than 5/95, high-temperature offset resistance may deteriorate. When the mass ratio is more than 25/75, low-temperature fixability and image gloss may deteriorate.

Charge Controlling Agent

The charge controlling agent is not particularly limited and can be suitably selected to suit to a particular application. Examples thereof include, but are not limited to, nigrosine dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, phosphorus and phosphorus-containing compounds, tungsten and tungsten-containing compounds, fluorine activators, metal salts of salicylic acid, and metal salts of salicylic acid derivatives. Specific examples thereof include, but are not limited to: BONTRON 03 (nigrosine dye), BONTRON P-51 (quaternary ammonium salt), BONTRON S-34 (metal-containing azo dye), BONTRON E-82 (metal complex of oxynaphthoic acid), BONTRON E-84 (metal complex of salicylic acid), and BONTRON E-89 (phenolic condensation product), available from Orient Chemical Industries Co., Ltd.; TP-302 and TP-415 (molybdenum complexes of quaternary ammonium salts), available from Hodogaya Chemical Co., Ltd.; LRA-901, and LR-147 (boron complex), available from Japan Carlit Co., Ltd.; and cooper phthalocyanine, perylene, quinacridone, azo pigments, and polymeric compounds having a functional group such as a sulfo group, a carboxyl group, and a quaternary ammonium group.

The amount of the charge controlling agent in the toner is not particularly limited and can be suitably selected to suit to a particular application. Preferably, the amount of the charge controlling agent in 100 parts by mass of the toner is from 0.1 to 10 parts by mass, more preferably from 0.2 to 5 parts by mass. When the amount is more than 10 parts by mass, chargeability of the toner becomes so large that the main effect of the charge controlling agent is reduced. As a result, the electrostatic attraction force between the toner and a developing roller is increased and the fluidity of the developer and the image density are lowered. The charge controlling agent may be melt-kneaded with the master batch or the binder resin and thereafter dissolved or dispersed in an organic solvent, or directly dissolved or dispersed in an organic solvent. Alternatively, the charge controlling agent may be fixed on the surface of the resulting toner particles.

The acid value of the toner is not particularly limited and can be suitably selected to suit to a particular application, but is preferably from 0.5 to 40 mgKOH/g for controlling low-temperature fixability (lower-limit fixable temperature) and the hot offset generating temperature. When the acid value is less than 0.5 mgKOH/g, it is likely that the effect of a base for improving dispersion stability is not exerted during the production process. In the case of using the prepolymer, it is likely that an elongation reaction and/or a cross-linking reaction easily progresses to reduce the production stability. When the acid value is more than 40 mgKOH/g, in the case of using the prepolymer, an elongation reaction and/or a cross-linking reaction is insufficiently performed, and high-temperature offset resistance may deteriorate.

The glass transition temperature (Tg) of the toner is not particularly limited and can be suitably selected to suit to a particular application. However, a glass transition temperature (Tg1st) that is determined at the first temperature rise in a DSC (differential scanning calorimetry) measurement is preferably 45° C. or higher and lower than 65° C., and more preferably 50° C. or higher and 60° C. or lower. In this case, low-temperature fixability, heat-resistant storage stability, and high durability are achieved. When Tg1st is lower than 45° C., blocking in a developing device and filming on a photoconductor may occur. When Tg1st is 65° C. or higher, low-temperature fixability may deteriorate.

A glass transition temperature (Tg2nd) that is determined at the second temperature rise in a DSC measurement of the toner is preferably 20° C. or higher and lower than 40° C. When Tg2nd is lower than 20° C., blocking in a developing device and filming on a photoconductor may occur. When Tg2nd is 40° C. or higher, low-temperature fixability may deteriorate.

The volume average particle diameter of the toner is not particularly limited and can be suitably selected to suit to a particular application, but is preferably from 3 to 7 μm. In addition, preferably, the ratio of the volume average particle diameter to the number average particle diameter is 1.2 or less. Furthermore, a proportion of toner particles having a volume average particle diameter of 2 μm or less is preferably from 1% to 10% by number.

Measurement Method of Hydroxyl Value and Acid Value

The hydroxyl value can be measured based on a method according to JIS K0070-1966 as follows.

First, 0.5 g of a sample is precisely weighed in a 100-mL volumetric flask, and 5 mL of an acetylating agent is further put in the flask. After being heated in a hot bath at 100±5° C. for 1 to 2 hours, the flask is taken out from the hot bath and let stand to cool. Water is further poured in the flask, and the flask is shaken to decompose acetic anhydride. To completely decompose acetic anhydride, the flask is reheated in the hot bath for 10 minutes or more and thereafter let stand to cool. The wall of the flask is sufficiently washed with an organic solvent.

The hydroxyl value is measured using an automatic potentiometric titrator DL-53 TITRATOR and electrodes DG113-SC (both manufactured by Mettler-Toledo International Inc.) at 23° C., and an analysis is performed using an analysis software program LabX Light Version 1.00.000. The calibration of the instrument is performed with a mixed solvent of 120 mL of toluene and 30 mL of ethanol under the following condition.

Measurement Conditions

Stir
  Speed [%] 25
  Time [s] 15
EQP Titration
  Titrant/Sensor
    Titrant CH3ONa
    Concentration [mol/L] 0.1
    Sensor DG115
    Unit of measurement mV
  Predispensing to volume
    Volume [mL] 1.0
    Wait time [s] 0
  Titrant addition Dynamic
    dE(set) [mV] 8.0
    dV(min) [mL] 0.03
    dV(max) [mL] 0.5
  Measure mode Equilibrium controlled
    dE [mV] 0.5
    dt [s] 1.0
    t(min) [s] 2.0
    t(max) [s] 20.0
  Recognition
    Threshold 100.0
    Steepest jump only No
    Range No
    Tendency None
  Termination
    at maximum volume [mL] 10.0
    at potential No
    at slope No
    after number EQPs Yes
      n=1
    comb. termination conditions No Evaluation
Procedure Standard
Potential1 No
Potential2 No
Stop for reevaluation No The acid value can be measured based on a method according to JIS K0070-1992 as follows.

First, 0.5 g of a sample (or 0.3 g of ethyl-acetate-soluble matter in the sample) is added to 120 mL of toluene and stirred at 23° C. for about 10 hours to be dissolved in the toluene. Further, 30 mL of ethanol is added thereto, thus preparing a sample solution. In a case in which the sample cannot be dissolved, another solvent such as dioxane and tetrahydrofuran is used. The acid value is measured using an automatic potentiometric titrator DL-53 TITRATOR and electrodes DG113-SC (both manufactured by Mettler-Toledo International Inc.) at 23° C., and an analysis is performed using an analysis software program LabX Light Version 1.00.000. The calibration of the instrument is performed with a mixed solvent of 120 mL of toluene and 30 mL of ethanol under the above-described conditions for measuring hydroxyl value.

More specifically, the sample solution is titrated with a 0.1N potassium hydroxide/alcohol solution, and the acid value is calculated from the following formula: Acid Value (mgKOH/g)=Titration Amount (mL)×N×56.1 (mg/mL)/Sample Mass (g), where N represents the factor of the 0.1N potassium hydroxide/alcohol solution.

Method of Measuring Melting Point and Glass Transition Temperature (Tg)

The melting point and glass transition temperature (Tg) can be measured using a DSC (differential scanning calorimeter) system (DSC-60 manufactured by Shimadzu Corporation).

More specifically, the melting point and glass transition temperature of a sample can be measured in the following manner.

First, about 5.0 mg of a sample is put in an aluminum sample container. The sample container is put on a holder unit and set in an electric furnace. The temperature is raised from 0° C. to 150° C. at a temperature rising rate of 10° C./min in nitrogen atmosphere. The sample is then cooled from 150° C. to 0° C. at a temperature falling rate of 10° C./min and reheating to 150° C. at a temperature rising rate of 10° C./min to obtain a DSC curve using a differential scanning calorimeter (DSC-60 manufactured by Shimadzu Corporation).

A glass transition temperature of the sample in the first temperature rise is determined by analyzing the DSC curve obtained in the first temperature rise using an analysis program "Endothermic shoulder temperature" in the DSC-60 system. Similarly, a glass transition temperature of the sample in the second temperature rise is determined by analyzing the DSC curve obtained in the second temperature rise using the analysis program "Endothermic shoulder temperature".

A melting point of the sample in the first temperature rise is determined by analyzing the DSC curve obtained in the first temperature rise using an analysis program "Peak temperature analysis program" in the DSC-60 system. Similarly, a melting point of the sample in the second temperature rise is determined by analyzing the DSC curve obtained in the second temperature rise using the analysis program "Peak temperature analysis program".

In the present disclosure, when the sample is a toner, the glass transition temperatures determined in the first temperature rise and the second temperature rise are denoted as Tg1st and Tg2nd, respectively.

In the present disclosure, the endothermic peak top temperature determined in the second temperature rise of each component is employed as the melting point Tm thereof.

Method of Measuring Particle Size Distribution

The volume average particle diameter (D4), number average particle diameter (Dn), and ratio (D4/Dn) therebetween of the toner can be measured using a particle size analyzer such as COULTER COUNTER TA-II and COULTER MULTISIZER II (both manufactured by Beckman Coulter, Inc.). In the present disclosure, a COULTER MULTISIZER II is used. The measurement method is as follows.

First, 0.1 to 5 mL of a surfactant (preferably a polyoxyethylene alkyl ether (i.e., a nonionic surfactant)), as a dispersant, is added to 100 to 150 mL of an electrolyte solution. Here, the electrolyte solution is an about 1% by mass NaCl aqueous solution prepared with the first grade sodium chloride, such as ISOTON-II (manufactured by Beckman Coulter, Inc.). A sample in an amount of from 2 to 20 mg is then added thereto. The electrolyte solution, in which the sample is suspended, is subjected to a dispersion treatment with an ultrasonic disperser for about 1 to 3 minutes. The electrolyte solution is thereafter subjected to a measurement of the volume and number of toner particles using the above measuring instrument equipped with a 100-μm aperture, to calculate volume and number distributions. The volume average particle diameter (D4) and number average particle diameter (Dn) are calculated from the volume and number distributions, respectively, measured above.

Thirteen channels with the following ranges are used for the measurement: not less than 2.00 μm and less than 2.52 μm; not less than 2.52 μm and less than 3.17 μm; not less than 3.17 μm and less than 4.00 μm; not less than 4.00 μm and less than 5.04 μm; not less than 5.04 μm and less than 6.35 μm; not less than 6.35 μm and less than 8.00 μm; not less than 8.00 μm and less than 10.08 μm; not less than 10.08 μm and less than 12.70 μm; not less than 12.70 μm and less than 16.00 μm; not less than 16.00 μm and less than 20.20 μm; not less than 20.20 μm and less than 25.40 μm; not less than 25.40 μm and less than 32.00 μm; and not less than 32.00 μm and less than 40.30 μm. Namely, particles having a particle diameter not less than 2.00 μm and less than 40.30 μm are to be measured.

External Additive

Examples of the external additive include, but are not limited to, oxide particles, inorganic particles, hydrophobized inorganic particles, and combinations thereof. Preferably, primary particles of the external additive have an average particle diameter of from 1 to 200 nm, more preferably from 10 to 150 nm. More preferably, the external additive contains at least one type of hydrophobized inorganic particles whose primary particles have an average particle diameter of 30 nm or less and at least one type of inorganic particles whose primary particles have an average particle diameter of 50 nm or more. External additives whose primary particles have an average particle diameter of 50 nm or more are easily blocked by a blade, and filming resistance and cleanability are improved. External additives whose primary particles have an average particle diameter of more than 200 nm have a lower adhesiveness to the toner, so that such inorganic particles tend to be released off from the toner particles under stress, possibly causing filming. Preferably, the specific surface area determined by the BET method of the external additive is from 20 to 500 $m^2/g$.

The external additive is not particularly limited and can be suitably selected to suit to a particular application. Examples thereof include, but are not limited to, silica particles, hydrophobic silica, metal salts of fatty acids (e.g., zinc stearate, aluminum stearate), metal oxides (e.g., titania, alumina, tin oxide, antimony oxide), and fluoropolymers.

The external additive contains coalesced particles in which primary particles are coalesced with each other to form non-spherical secondary particles. The external additive may optionally contain other components. Hereinafter, as an example of the coalesced particles, non-spherical silica in which primary particles of the silica are coalesced with each other to form secondary particles of the silica is described.

Non-Spherical Silica

The non-spherical silica comprises secondary particles in which primary particles of silica are coalesced with each other.

Primary Particles

The average particle diameter (Da) of the primary particles is not particularly limited and can be suitably selected to suit to a particular application, but is preferably from 20 to 150 nm, more preferably from 35 to 150 nm. When Da of the primary particles is less than 20 nm, the secondary particles cannot function to exert the spacer effect, and embedding of the external additive into the toner base particles, caused by an external stress, cannot be suppressed. When Da of the primary particles is more than 150 nm, the external additive is likely to liberate from the toner particles and cause filming on a photoconductor.

FIG. 1 is a photograph of a coalesced particle of the present embodiment.

A coalesced particle 1 is a non-spherical particle in which primary particles 1A to 1D are coalesced with each other. The coalesced particle 1 is different from a type of secondary particle in which primary particles are simply agglomerated while maintaining their shapes.

The average particle diameter (Da) of the primary particles is determined based on the particle diameter of each of the primary particles (i.e., the length of each arrow in FIG. 1) in the non-spherical silica. The average particle diameter of the primary particles is measured as follows. First, the secondary particles are dispersed in a suitable solvent (e.g., tetrahydrofuran (THF)), then dried and deposited on a substrate by removing the solvent. The resulting sample is observed with a field emission scanning electron microscope (FE-SEM, at an acceleration voltage of 5 to 8 kV and an observation magnification of 8,000 to 10,000 times) to measure the longest length of each of the coalesced primary particles (i.e., the length of each arrow in FIG. 1) in the field of view, and the measured values are averaged to determine the average particle diameter. (The number of measured particles is from 100 to 200.)

Non-Spherical Silica

As described above, the non-spherical silica comprises secondary particles in which primary particles of silica are coalesced with each other. The non-spherical silica is not particularly limited and can be suitably selected to suit to a particular application as long as the non-spherical silica comprises secondary particles in which primary particles are coalesced with each other via chemical bonds formed using a treatment agent (to be described later). Preferably, the non-spherical silica is obtained by a sol-gel method.

The average particle diameter (db) of the non-spherical silica is not particularly limited and can be suitably selected to suit to a particular application, but is preferably from 50 to 200 nm, more preferably from 100 to 180 nm, and particularly preferably from 100 to 160 nm. When the average particle diameter is less than 50 nm, it is difficult to achieve the spacer effect and to suppress embedding into the toner base particles caused by an external stress. When the average particle diameter is more than 200 nm, the silica is likely to liberate from the toner particles and fixedly adhere onto a photoconductor, and desired filming resistance may not be exhibited. When the average particle diameter is from 50 to 200 nm, embedding into the toner base particles is suppressed, and fluidity and transferability are advantageously improved.

The average particle diameter (db) of the non-spherical silica is measured as follows. First, the secondary particles are dispersed in a suitable solvent (e.g., tetrahydrofuran (THF)), then dried and deposited on a substrate by removing the solvent. The resulting sample is observed with a field emission scanning electron microscope (FE-SEM, at an acceleration voltage of 5 to 8 kV and an observation magnification of 8,000 to 10,000 times) to measure the longest length of each of the secondary particles (i.e., the length of the arrow in FIG. 2) in the field of view, and the measured values are averaged to determine the average particle diameter. (The number of measured particles is from 10 to 200.)

Degree of Coalescence of Non-Spherical Silica

The degree of coalescence (G) of each of the non-spherical silica particles is represented by the ratio of the particle diameter of the non-spherical silica particle (secondary particle) to the average particle diameter of the primary particles contained in the secondary particle (i.e., particle diameter of secondary particle/average particle diameter of primary particles). The particle diameter of the non-spherical silica particle (secondary particle) and the average particle diameter of the primary particles are measured and calculated by the method described above. The degree of coalescence (G) can be arbitrarily controlled by adjusting the primary particle diameter, the type and amount of a treatment agent (to be described later), and treatment conditions.

The average value of the degree of coalescence (G) (i.e., particle diameter of secondary particle/average particle diameter of primary particles) of the non-spherical silica particles is not particularly limited and can be suitably selected to suit to a particular application, but is preferably from 1.5 to 4.0, more preferably from 2.0 to 3.0. When the average value of the degree of coalescence (G) is less than 1.5, the external additive is likely to roll and be embedded into recessed portions on the surface of the toner base particles, and the transferability may not be excellent. When it is more than 4.0, the external additive is likely to be released from the toner particles, so that the charge may decrease due to carrier contamination or an image defect may occur over time due to a scratch made on a photoconductor.

The proportion of the non-spherical silica particles having a degree of coalescence of less than 1.5 is not particularly limited and can be suitably selected to suit to a particular application, but is preferably 10% by number or less relative to the non-spherical silica particles contained in the toner. The non-spherical silica particles have a distribution in terms of the degree of coalescence because of their production process. The particles having a degree of coalescence of less than 1.5 are those in which coalescence has not progressed, which are in a substantially spherical shape. Therefore, it is difficult for such particles to achieve the function as an irregular-shaped additive that is characterized for suppressing embedding. The amount of the non-spherical silica particles having a degree of coalescence of less than 1.5 is determined by the method described above. That is, 100 to 200 particles of the non-spherical silica particles are subjected to the measurement of the primary particle diameter and the secondary particle diameter to calculate the degree of coalescence of each non-spherical silica particle, then the number of particles having a degree of coalescence of less than 1.5 is divided by the number of particles subjected to the measurement.

Indicator for Stirring of Non-Spherical Silica

The non-spherical silica is not particularly limited and can be suitably selected to suit to a particular application. Preferably, the non-spherical silica satisfies the following formula (ii), more preferably satisfies the following formula (ii-1), for maintaining the cohesive force (coalescence force) between the primary particles under a certain stirring condition and improving durability of the toner.

$$Nx/1{,}000\times 100\leq 30\% \quad \text{Formula (ii)}$$

$$Nx/1{,}000\times 100\leq 20\% \quad \text{Formula (ii-1)}$$

In the formulae (ii) and (ii-1), Nx represents the number of primary particles present alone in a region where 1,000 particles of the non-spherical silica are observed with a scanning electron microscope, after the non-spherical silica in an amount of 0.5 g and a carrier in an amount of 49.5 g have been stirred in a 50-mL vial with a mix-stirrer at 67 Hz for 10 minutes.

Figure 3:
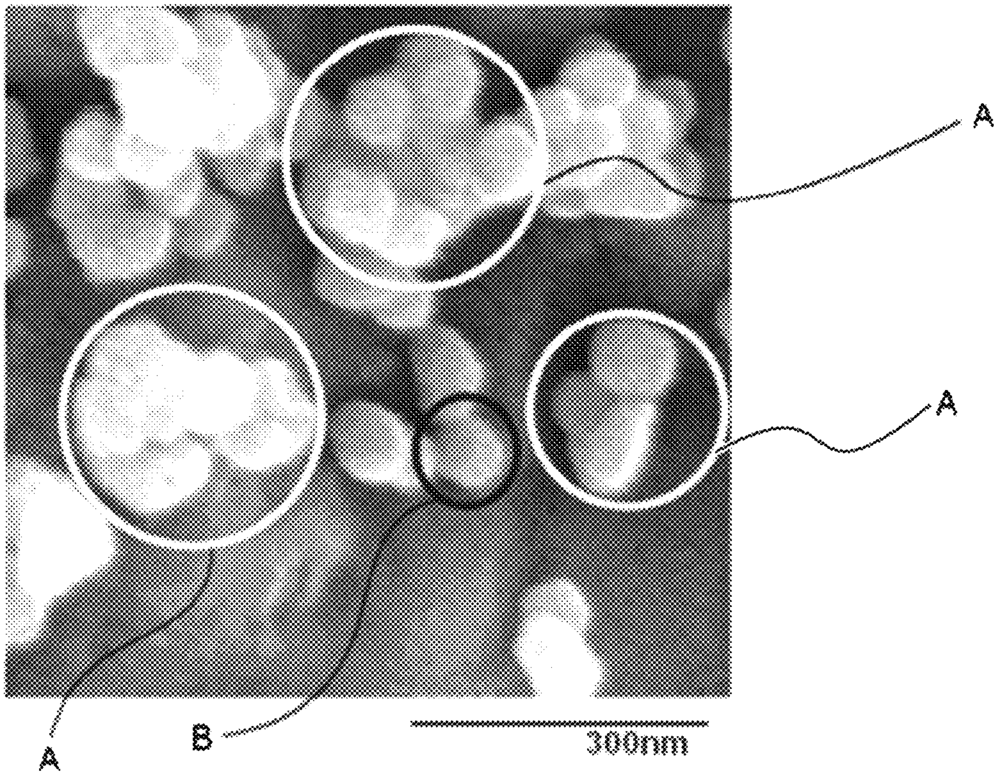
FIG. 3 is a photograph of an external additive according to an embodiment of the present invention.

When the cohesive force of the non-spherical silica is strong (e.g., as in FIG. 3, when the proportion of primary particles present alone (as indicated by B in FIG. 3) with respect to 1,000 non-spherical silica particles is 30% or less), the number of primary particles which are generated by crack or collapse of the external additive in the toner caused by the load of a developing device is reduced, embedding or rolling of the external additive is suppressed, and a high transfer rate is maintained over time.

When the cohesive force of the non-spherical silica is weak (e.g., when the proportion of primary particles present alone (as indicated by B in FIG. 3) with respect to 1,000 secondary particles is more than 30%), the number of primary particles which are generated by crack or collapse of the external additive in the toner caused by the load of a developing device is increased, the proportion of spherical primary particles is increased, moving or embedding of the external additive is likely to occur, and a high transfer rate is difficult to maintain over time. When the primary particles have an excessively small particle diameter (e.g., less than 80 nm), it is likely that the external additive is embedded in the toner base particles or rolls into recessed portions. Thus, it may be difficult to maintain transferability and chargeability. When the primary particles have an excessively large particle diameter (e.g., more than 200 nm), the external additive is likely to be released from the toner particles, and the charge may decrease due to carrier contamination or an image defect may occur over time due to a scratch made on a photoconductor.

In the formulae (ii) and (ii-1), the primary particles refer to those present alone without becoming coalesced with each other after the secondary particles have been stirred under the above-described stirring conditions using the mix-stirrer. Such primary particles include those generated upon crack or collapse of the external additive after the stirring and those having been present alone from before the stirring, which are not coalesced with each other as indicated by B in FIG. 3. In the formulae (ii) and (ii-1), the shape of the primary particles is not particularly limited and can be suitably selected to suit to a particular application as long as the particles are not coalesced with each other. Such primary particles are often present in a substantially spherical shape, as indicated by B in FIG. 3.

In the formulae (ii) and (ii-1), a method for confirming the presence of the primary particles is not particularly limited and can be suitably selected to suit to a particular application. Preferred examples thereof include observing the primary particles with a scanning electron microscope (SEM) to confirm whether the primary particles are present alone. A method for measuring the average particle diameter of the primary particles is not particularly limited and can be suitably selected to suit to a particular application. Preferably, the method includes observing the primary particles with a field emission scanning electron microscope (FE-SEM, at an acceleration voltage of 5 to 8 kV and an observation magnification of 8,000 to 10,000 times) to measure the particle diameter of each of the primary particles in the field of view, and averaging the measured values. (The number of measured particles is 100 or more.)

In the formulae (ii) and (ii-1), in measuring the number of primary particles present alone after the stirring with respect to 1,000 particles of the non-spherical silica, by observing them with a scanning electron microscope, a particle present alone, as indicated by B in FIG. 3, is counted as one primary particle. A secondary particle in which multiple particles are coalesced with each other, confirmed by observation with the scanning electron microscope, is counted as one secondary particle. In the formulae (ii) and (ii-1), the number of primary particles present alone per 1,000 particles of the non-spherical silica can be measured, for example, by measuring the number of primary particles per 1,000 particles of the non-spherical silica present in an observation region observed with a scanning electron microscope at a particle density and an observation magnification at which the contours of the non-spherical silica particles and the primary particles can be distinguished. The observation region may be suitably adjusted so that a plurality of arbitrary fields of view or regions, preferably a plurality of adjacent fields of view or regions, includes 1,000 or more particles of the non-spherical silica to be observed with a scanning electron microscope.

As the mix-stirrer, a rocking mill (manufactured by SEIWA GIKEN Corporation) is used. The carrier is not particularly limited and can be suitably selected to suit to a particular application. Preferably, the carrier is a coated ferrite powder obtained by coating a fired ferrite powder with a coating layer forming solution of an acrylic resin and a silicone resin containing alumina particles and drying the coating layer forming solution. The 50-mL vial is not particularly limited and can be suitably selected to suit to a particular application. Examples thereof include commercially available glass vials (manufactured by NICHIDEN RIKA GLASS CO, LTD.).

Particle Size Distribution Index of Non-Spherical Silica

A particle size distribution index of the non-spherical silica is not particularly limited and can be suitably selected to suit to a particular application. Preferably, the non-spherical silica satisfies the following formula (iii), for solving problems particularly relating to toner filming. When the non-spherical silica comprises particles having a sharp particle size distribution as represented by the following formula (iii), the toner is imparted with excellent filming resistance.

$$Db50/Db10\leq 1.20 \quad \text{Formula (iii)}$$

In the formula (iii), Db50 represents a particle diameter of the non-spherical silica at which a cumulative value becomes 50% by number and db10 represents a particle diameter of the non-spherical silica at which a cumulative value becomes 10% by number, in a cumulative particle size distribution chart of the non-spherical silica having the horizontal axis representing the particle diameter (nm) and the vertical axis representing the cumulative value (% by number), drawn from the small-particle side.

Db50 appears in the cumulative particle size distribution chart of the non-spherical silica having the horizontal axis representing the particle diameter (nm) and the vertical axis representing the cumulative value (% by number). For example, db50 refers to the particle diameter of the 100th particle of the non-spherical silica when the number of particles of the non-spherical silica subjected to the measurement is 200, and refers to the particle diameter of the 75th particle of the non-spherical silica when the number of particles of the non-spherical silica subjected to the measurement is 150.

Db50 is measured as follows. First, the non-spherical silica is dispersed in a suitable solvent (e.g., tetrahydrofuran (THF)), then dried and deposited on a substrate by removing the solvent. The resulting sample is observed with a field emission scanning electron microscope (FE-SEM, at an acceleration voltage of 5 to 8 kV and an observation magnification of 8,000 to 10,000 times) to measure the particle diameter of each of the non-spherical silica particles in the field of view and determine the particle diameter at which the cumulative value becomes 50%. The particle diameter of each of the non-spherical silica particles is determined by measuring the longest length of each of the coalesced secondary particles (i.e., the length of the arrow in FIG. 2). (The number of measured particles is from 100 to 200.)

db10 appears in the cumulative particle size distribution chart of the non-spherical silica having the horizontal axis representing the particle diameter (nm) and the vertical axis representing the cumulative value (% by number). For example, db10 refers to the particle diameter of the 20th particle of the non-spherical silica when the number of particles of the non-spherical silica subjected to the measurement is 200, and refers to the particle diameter of the 15th particle of the non-spherical silica when the number of particles of the non-spherical silica subjected to the measurement is 150.

Db10 is measured as follows. First, the non-spherical silica is dispersed in a suitable solvent (e.g., tetrahydrofuran (THF)), then dried and deposited on a substrate by removing the solvent. The resulting sample is observed with a field emission scanning electron microscope (FE-SEM, at an acceleration voltage of 5 to 8 kV and an observation magnification of 8,000 to 10,000 times) to measure the particle diameter of each of the non-spherical silica particles in the field of view and determine the particle diameter at which the cumulative value becomes 10%. The particle diameter of each of the non-spherical silica particles is determined by measuring the longest length of each of the coalesced secondary particles (i.e., the length of the arrow in FIG. 2). (The number of measured particles is from 100 to 200.)

The ratio db50/db10 is not particularly limited and can be suitably selected to suit to a particular application, but is preferably 1.20 or less, more preferably 1.15 or less. When the ratio db50/db10 is more than 1.20, the particle size distribution of the non-spherical silica is wide, and the number of small-particle-diameter particles may increase. That is, it means that at least one of "small-particle-diameter particle A" in which coalescence has not progressed and which present as a primary particle and "small-particle-diameter particle B" in which coalescence has progressed but the primary particle thereof has a small particle diameter is large in number. When the amount of the small-particle-diameter particle A is large, the function as a non-spherical external additive cannot be fully achieved, and embedding resistance is poor, so that an abnormal image may be generated. When the amount of the small-particle-diameter particle B is large, the spacer effect cannot be achieved, and embedding of the external additive into the toner base particles, caused by an external stress, cannot be suppressed. Therefore, it is preferable to reduce the numbers of the small-particle-diameter particle A and the small-particle-diameter particle B.

A method for reducing the numbers of the small-particle-diameter particle A and the small-particle-diameter particle B is not particularly limited and can be suitably selected to suit to a particular application. Preferred examples thereof include removing small-particle-diameter particles in advance by a classification treatment.

Shape of Non-Spherical Silica

Figure 2:
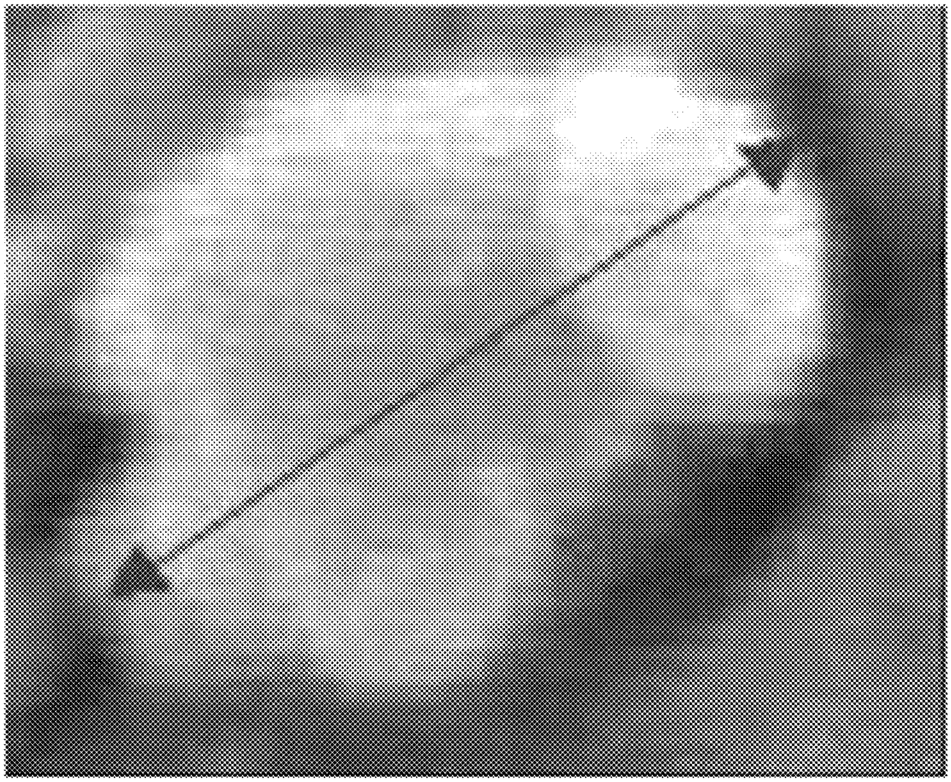
FIG. 2 is a photograph of a coalesced particle of an external additive of a toner according to an embodiment of the present invention, obtained with a scanning electron microscope (SEM)

The shape of the non-spherical silica is not particularly limited and can be suitably selected to suit to a particular application as long it is a non-spherical shape in which particles are coalesced with each other. Examples thereof include a non-spherical shape in which two or more particles are coalesced with each other as illustrated in FIGS. 1 and 2. The use of the non-spherical silica achieves a high fluidity of the toner, and makes it possible to maintain a high transfer rate over time because embedding and rolling of the external additive is suppressed even in a case where the toner is applied with a load by being stirred in a developing device. In addition, durability of the toner is high because the cohesive force (coalescence force) between the primary particles of the non-spherical silica is maintained even under a certain stirring condition.

A method for confirming whether the primary particles in the non-spherical silica are coalesced with each other is not particularly limited and can be suitably selected to suit to a particular application. Preferred examples thereof include observing the primary particles with a field emission scanning electron microscope (FE-SEM).

Method for Producing Non-Spherical Silica

A method for producing the non-spherical silica is not particularly limited and can be suitably selected to suit to a particular application. Examples thereof include, but are not limited to, a sol-gel method and a dry method. In particular, a sol-gel method is preferred. Specifically, preferred methods of producing the non-spherical silica (secondary particles) include mixing or firing the primary particles with a treatment agent (to be described later) to cause chemical bonding and secondary agglomeration. In the case of the sol-gel method, the non-spherical silica may be prepared by a one step reaction in the presence of the treatment agent. The non-spherical silica produced by the sol-gel method is preferred in that particle size control is easier than the dry method, the particle size distribution is sharp, and the moisture adsorptivity is excellent. Since the particle size distribution is sharp, embedding of excessively-small-particle-diameter particles into toner base particles or liberation of excessively-large-particle-diameter particles from toner base particles are suppressed. In addition, since the non-spherical silica produced by the sol-gel method is porous unlike dry silica and is considered to adsorb moisture, the influence of humidity on polyester resins can be reduced, and suppression of change in shape and improvement in storability are expected.

Treatment Agent

The treatment agent is not particularly limited and can be suitably selected to suit to a particular application. Examples thereof include, but are not limited to, silane-based treatment agents and epoxy-based treatment agents. Each of these can be used alone or in combination with others. In the case of using primary particles of silica, silane-based treatment agents are preferred because Si—O—Si bonds formed by the silane-based treatment agents are more thermally stable than Si—O—C bonds formed by the epoxy-based treatment agents. If necessary, a treatment aid (e.g., water, 1% by mass acetic acid aqueous solution) may be used.

Silane-Based Treatment Agent

The silane-based treatment agents are not particularly limited and can be suitably selected to suit to a particular application. Specific examples thereof include, but are not limited to, alkoxysilanes (e.g., tetramethoxysilane, tetraethoxysilane, methyltrimethoxysilane, methyltriethoxysilane, dimethyldimethoxysilane, dimethyldiethoxysilane, methyldimethoxysilane, methyldiethoxysilane, diphenyldimethoxysilane, isobutyltrimethoxysilane, decyltrimethoxysilane), silane coupling agents (e.g., γ-aminopropyltriethoxysilane, γ-glycidoxypropyltrimethoxysilane, γ-glycidoxypropylmethyldiethoxysilane, γ-methacryloxypropyltrimethoxysilane, γ-mercaptopropyltrimethoxysilane, vinyltriethoxysilane, methylvinyldimethoxysilane), vinyltrichlorosilane, dimethyldichlorosilane, methylvinyldichlorosilane, methylphenyldichlorosilane, phenyltrichlorosilane, N,N'-bis(trimethylsilyl)urea, N,O-bis(trimethylsilyl)acetamide, dimethyltrimethylsilylamine, hexamethyldisilazane, cyclic silazane, and mixtures thereof.

As described below, the silane-based treatment agent causes the primary particles of the silica (hereinafter "silica primary particles") to chemically bond to each other to form secondary agglomerates. When the silica primary particles are treated with an alkoxysilane or a silane coupling agent as the silane-based treatment agent, as in the following formula (A), a silanol group bonded to the silica primary particles and an alkoxy group bonded to the silane-based treatment agent undergo a dealcoholization reaction to form a new Si—O—Si bond, thereby causing secondary agglomeration. When the silica primary particles are treated with a chlorosilane as the silane-based treatment agent, a chloro group of the chlorosilane and a silanol group bonded to the silica primary particles undergo a dehydrochlorination reaction to form a new Si—O—Si bond, thereby causing secondary agglomeration. When the silica primary particles are treated with a chlorosilane as the silane-based treatment agent, in the case where water coexists in the system, the chlorosilane is first hydrolyzed with water to form a silanol group, then this silanol group and another silanol group bonded to the silica primary particles undergo a dehydration reaction to form a new Si—O—Si bond, thereby causing secondary agglomeration. When the silica primary particles are treated with a silazane as the silane-based treatment agent, an amino group and a silanol group bonded to the silica primary particles undergo a deammoniation reaction to form a new Si—O—Si bond, thereby causing secondary agglomeration.

Formula (A)

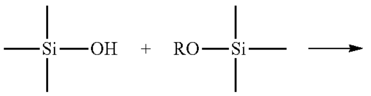

-continued

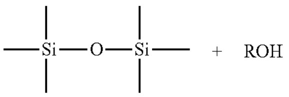

In the formula (A), R represents an alkyl group.

Epoxy-Based Treatment Agent

The epoxy-based treatment agents are not particularly limited and can be suitably selected to suit to a particular application. Examples thereof include, but are not limited to, bisphenol-A epoxy resins, bisphenol-F epoxy resins, phenol novolac epoxy resins, cresol novolac epoxy resins, bisphenol-A-novolac epoxy resins, biphenol epoxy resins, glycidyl amine epoxy resins, and alicyclic epoxy resins.

As in the following formula (B), the epoxy-based treatment agent causes the silica primary particles to chemically bond to each other to form secondary agglomerates. When the silica primary particles are treated with the epoxy-based treatment agent, a silanol group bonded to the silica primary particles adds an oxygen atom of an epoxy group of the epoxy-based treatment agent and a carbon atom bonded to the epoxy group to form a new Si—O—C bond, thereby causing secondary agglomeration.

Formula (B)

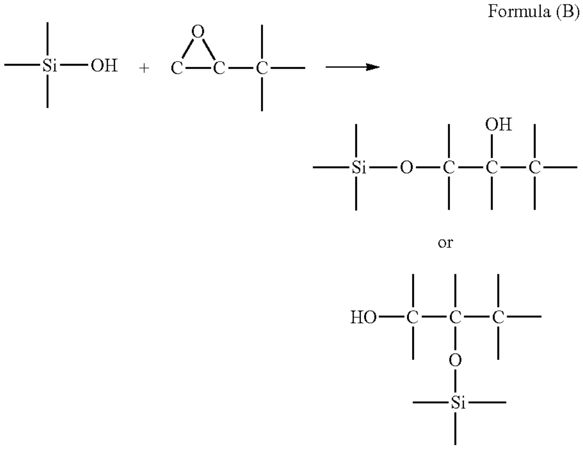

or

The mixing mass ratio between the primary particles and the treatment agent (i.e., primary particles:treatment agent) is not particularly limited and can be suitably selected to suit to a particular application, but preferably ranges from 100:0.01 to 100:50. The larger the amount of the treatment agent is, the higher the degree of coalescence tends to be.

A method for mixing the treatment agent and the primary particles is not particularly limited and can be suitably selected to suit to a particular application. Examples thereof include, but are not limited to, mixing the treatment agent and the primary particles with a known mixer (e.g., spray dryer). In the mixing, the treatment agent may be mixed after the primary particles are prepared, or the primary particles may be prepared by a one step reaction in the presence of the treatment agent.

The firing temperature of the treatment agent and the primary particles is not particularly limited and can be suitably selected to suit to a particular application, but is preferably from 100° C. to 2,500° C. The higher the firing temperature is, the higher the degree of coalescence tends to be.

The firing time of the treatment agent and the primary particles is not particularly limited and can be suitably selected to suit to a particular application, but is preferably from 0.5 to 30 hours.

The amount of the external additive is not particularly limited and can be suitably selected to suit to a particular application, but is preferably from 0.5 to 6.0 parts by mass, more preferably from 1.0 to 4.0 parts by mass, based on 100 parts by mass of toner base particles.

Other Additives

Examples of other additives include titania particles, titanium oxide particles, and alumina particles. Specific examples of titania particles include, but are not limited to, P-25 (manufactured by Nippon Aerosil Co., Ltd.); STT-30 and STT-65C-S (manufactured by Titan Kogyo, Ltd.); TAF-140 (manufactured by Fuji Titanium Industry Co., Ltd.); and MT-150W, MT-500B, MT-600B, and MT-150A (manufactured by TAYCA Corporation).

Specific examples of hydrophobized titanium oxide particles include, but are not limited to, T-805 (manufactured by Nippon Aerosil Co., Ltd.), STT-30A and STT-65S-S (manufactured by Titan Kogyo, Ltd.); TAF-500T and TAF-1500T (manufactured by Fuji Titanium Industry Co., Ltd.); MT-100S and MT-100T (manufactured by TAYCA Corporation); and IT-S (manufactured by Ishihara Sangyo Kaisha, Ltd.).

Hydrophobized oxide particles, hydrophobized silica particles, hydrophobized titania particles, and hydrophobized alumina particles can be obtained by treating hydrophilic particles thereof with a silane coupling agent such as methyltrimethoxysilane, methyltriethoxysilane, and octyltrimethoxysilane. In addition, silicone-oil-treated oxide particles and silicone-oil-treated inorganic particles, which have been treated with a silicone oil optionally upon application of heat, are also preferred.

Specific examples of the silicone oil include, but are not limited to, dimethyl silicone oil, methylphenyl silicone oil, chlorophenyl silicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, acryl- or methacryl-modified silicone oil, and α-methylstyrene-modified silicone oil. Specific examples of the inorganic particles include, but are not limited to, silica, alumina, titanium oxide, barium titanate, magnesium titanate, calcium titanate, strontium titanate, iron oxide, copper oxide, zinc oxide, tin oxide, quartz sand, clay, mica, sand-lime, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Among these materials, silica and titanium dioxide are preferred.

The amount of the external additive is not particularly limited and can be suitably selected to suit to a particular application. The proportion thereof in the toner is preferably from 0.1% to 5% by mass, more preferably from 0.3% to 3% by mass.

The average particle diameter of primary particles of the inorganic particles is not particularly limited and can be suitably selected to suit to a particular application, but is preferably 200 nm or less, more preferably from 10 to 100 nm. When the average particle diameter is below the preferred range, the inorganic particles may be embedded in the toner base particles and cannot effectively exhibit their function. When the average particle diameter is above the preferred range, the inorganic particle may undesirably and unevenly damage the surface of a photoconductor.

Other Components

Other components contained in the toner are not particularly limited and can be suitably selected to suit to a particular application. Examples thereof include, but are not limited to, a magnetic material, a cleanability improving agent, a fluidity improving agent, and a charge controlling agent.

Fluidity Improving Agent

The fluidity improving agent is not particularly limited and can be suitably selected to suit to a particular application as long as it reforms a surface to improve hydrophobicity to prevent deterioration of fluidity and chargeability even under high-humidity environments. Specific examples thereof include, but are not limited to, silane coupling agents, silylation agents, silane coupling agents having a fluorinated alkyl group, organic titanate coupling agents, aluminum coupling agents, silicone oils, and modified silicone oils. Preferably, the above-described silica and titanium oxide are surface-treated with such a fluidity improving agent to become hydrophobic silica and hydrophobic titanium oxide, respectively.

Cleanability Improving Agent

The cleanability improving agent is not particularly limited and can be suitably selected to suit to a particular application as long as it is an additive that facilitates easy removal of the developer (toner) remaining on a photoconductor or primary transfer medium after image transfer. Specific examples thereof include, but are not limited to, metal salts of fatty acids (e.g., zinc stearate and calcium stearate) and fine particles of polymers prepared by soap-free emulsion polymerization (e.g., polymethyl methacrylate and polystyrene). Preferably, the particle size distribution of the fine particles of polymers is as narrow as possible. More preferably, the volume average particle diameter thereof is in the range of from 0.01 to 1 μm.

Magnetic Material

The magnetic material is not particularly limited and can be suitably selected to suit to a particular application. Examples thereof include, but are not limited to, iron powder, magnetite, and ferrite. In particular, those having white color tone are preferred.

Method for Manufacturing Toner

A method for manufacturing the toner is not particularly limited and can be suitably selected to suit to a particular application. Preferably, the toner is manufactured by dispersing, in an aqueous medium, an oil phase containing at least the amorphous polyester resin, the crystalline polyester resin, the release agent, and the colorant.

As an example of such a method for manufacturing the toner, a dissolution suspension method is known.

Another example of the method for manufacturing the toner includes the process of forming toner base particles while forming a reaction product (hereinafter may be referred to as "adhesive base material") through an elongation reaction and/or a cross-linking reaction of the active-hydrogen-group-containing compound with the polymer having a site reactive with an active-hydrogen-group-containing compound. This method involves the processes of preparation of an aqueous medium, preparation of an oil phase containing toner materials, emulsification or dispersion of the toner materials, and removal of an organic solvent.

Preparation of Aqueous Phase

The aqueous phase may be prepared by dispersing resin particles in an aqueous medium. The proportion of the resin particles in the aqueous medium is not particularly limited and can be suitably selected to suit to a particular application, but is preferably from 0.5% to 10% by mass. The resin particles are not particularly limited and can be suitably selected to suit to a particular application. Examples thereof include, but are not limited to, surfactants, poorly-water-soluble inorganic compound dispersants, and polymeric protective colloids. Each of these may be used alone or in combination with others. Among these, surfactants are preferred.

The aqueous medium is not particularly limited and can be suitably selected to suit to a particular application. Specific examples thereof include, but are not limited to, water, water-miscible solvents, and mixtures thereof. Each of these can be used alone or in combination with others.

Among these, water is preferred.

The water-miscible solvents are not particularly limited and can be suitably selected to suit to a particular application. Examples thereof include, but are not limited to, alcohols, dimethylformamide, tetrahydrofuran, cellosolves, and lower ketones. The alcohols are not particularly limited and can be suitably selected to suit to a particular application. Specific examples thereof include, but are not limited to, methanol, isopropanol, and ethylene glycol. The lower ketones are not particularly limited and can be suitably selected to suit to a particular application. Specific examples thereof include, but are not limited to, acetone and methyl ethyl ketone.

Preparation of Oil Phase

The oil phase containing toner materials can be prepared by dissolving or dispersing, in an organic solvent, toner materials including the active-hydrogen-group-containing compound, the polymer having a site reactive with an active-hydrogen-group-containing compound, the crystalline polyester resin, the amorphous polyester resin, the release agent, the hybrid resin, the colorant, and the like.

The organic solvent is not particularly limited and can be suitably selected to suit to a particular application, but an organic solvent having a boiling point less than 150° C. is preferred for easy removal.

The organic solvent having a boiling point less than 150° C. is not particularly limited and can be suitably selected to suit to a particular application. Specific examples thereof include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. Each of these can be used alone or in combination with others.

Among these solvents, ethyl acetate, toluene, xylene, benzene, methylene chloride, 1,2-dichloroethane, chloroform, and carbon tetrachloride are preferred, and ethyl acetate is more preferred.

Emulsification or Dispersion

Emulsification or dispersion of the toner materials is performed by dispersing the oil phase containing the toner materials in the aqueous medium. At the time when the toner materials are emulsified or dispersed, the active-hydrogen-group-containing compound and the polymer having a site reactive with an active-hydrogen-group-containing compound are subjected to an elongation reaction and/or a cross-linking reaction to form an adhesive base material.

The adhesive base material may be produced by, for example, emulsifying or dispersing an oil phase containing a polymer reactive with an active hydrogen group, such as a polyester prepolymer having an isocyanate group, along with a compound having an active hydrogen group, such as an amine, in the aqueous medium to allow them to elongate and/or cross-link with each other in the aqueous medium; emulsifying or dispersing an oil phase containing toner materials in an aqueous medium to which a compound having an active hydrogen group is added in advance; or emulsifying or dispersing an oil phase containing toner materials in an aqueous medium and then adding a compound having an active hydrogen group thereto to allow them to elongate and/or cross-link with each other at the interfaces between the produced particles and the aqueous medium. In a case in which an elongation reaction and/or a cross-linking reaction is caused from the interfaces of dispersed particles, an urea-modified polyester resin is preferentially formed at the surface of the resulting toner while forming a concentration gradient of the urea-modified polyester within the toner.

The reaction conditions (e.g., reaction time, reaction temperature) for forming the adhesive base material are not particularly limited and determined depending on the combination of the active-hydrogen-group-containing compound and the polymer having a site reactive with an active-hydrogen-group-containing compound.

The reaction time is not particularly limited and can be suitably selected to suit to a particular application, but is preferably from 10 minutes to 40 hours, more preferably from 2 to 24 hours.

The reaction temperature is not particularly limited and can be suitably selected to suit to a particular application, but is preferably from 0° C. to 150° C., more preferably from 40° C. to 98° C.

A method for reliably forming a dispersion liquid containing the polymer having a site reactive with an active-hydrogen-group-containing compound (e.g., polyester prepolymer having an isocyanate group) is not particularly limited and can be suitably selected to suit to a particular application. Examples thereof include a method of adding, in an aqueous medium, an oil phase prepared by dissolving or dispersing toner materials in a solvent, and dispersing the oil phase therein by application of a shearing force.

A disperser for dispersing the oil phase is not particularly limited and can be suitably selected to suit to a particular application. Examples thereof include, but are not limited to, low-speed shear-type dispersers, high-speed shear-type dispersers, friction-type dispersers, high-pressure jet dispersers, and ultrasonic dispersers.

Among these dispersers, high-speed shear-type dispersers are preferred because they can adjust the particle diameter of the dispersoids (oil droplets) to 2 to 20 μm.

When the high-speed shear disperser is used, dispersing conditions, such as the rotation speed, dispersing time, and dispersing temperature, can be determined depending on the purpose.

The number of revolutions is not particularly limited and can be suitably selected to suit to a particular application, but is preferably from 1,000 to 30,000 rpm, more preferably from 5,000 rpm to 20,000 rpm.

The dispersing time is not particularly limited and can be suitably selected to suit to a particular application, but is preferably from 0.1 to 5 minutes in the case of batch-type disperser.

The dispersing temperature is not particularly limited and can be suitably selected to suit to a particular application, but is preferably from 0° C. to 150° C. more preferably from 40° C. to 98° C., under pressure. Generally, as the dispersing temperature becomes higher, the dispersing becomes easier.

The amount of the aqueous medium used to emulsify or disperse the toner materials is not particularly limited and can be suitably selected to suit to a particular application, but is preferably in the range of from 50 to 2,000 parts by mass, more preferably from 100 to 1,000 parts by mass, based on 100 parts by mass of the toner materials.

When the used amount of the aqueous medium is less than 50 parts by mass, the dispersion state of the toner materials may be poor, and the resulting toner base particles cannot have a desired particle diameter. When the used amount of the aqueous medium exceeds 2,000 parts by mass, manufacturing cost may be increased.

Preferably, when the oil phase containing the toner materials is emulsified or dispersed in the aqueous medium, a dispersant is used to stabilize dispersoids (oil droplets) to obtain toner particles with a desired shape and a narrow particle size distribution.

The dispersant is not particularly limited and can be suitably selected to suit to a particular application. Examples thereof include, but are not limited to, surfactants, poorly-water-soluble inorganic compound dispersants, and polymeric protective colloids. Each of these can be used alone or in combination with others. Among these, surfactants are preferred.

The surfactants are not particularly limited and can be suitably selected to suit to a particular application. Examples thereof include, but are not limited to, anionic surfactants, cationic surfactants, nonionic surfactants, and ampholytic surfactants.

The anionic surfactants are not particularly limited and can be suitably selected to suit to a particular application. Specific examples thereof include, but are not limited to, alkylbenzene sulfonates, α-olefin sulfonates, and phosphates.

Among these, those having a fluoroalkyl group are preferred.

In the elongation reaction and/or cross-linking reaction for forming the adhesive base material, a catalyst may be used.

The catalyst is not particularly limited and can be suitably selected to suit to a particular application. Specific examples thereof include, but are not limited to, dibutyltin laurate and dioctyltin laurate.

Removal of Organic Solvent

A method for removing the organic solvent from the dispersion liquid (emulsion slurry) is not particularly limited and can be suitably selected to suit to a particular application. For example, the method may include the process of gradually raising the temperature of the reaction system to completely evaporate the organic solvent from oil droplets, or spraying the dispersion liquid into dry atmosphere to completely evaporate the organic solvent from oil droplets.

As the organic solvent has been removed, toner base particles are formed. The toner base particles may be washed and dried, and optionally classified by size. The classification may be performed in a liquid by removing ultrafine particles by cyclone separation, decantation, or centrifugal separation. Alternatively, the classification may be performed after the drying.

The toner base particle may be further mixed with particles of the external additive, the charge controlling agent, or the like. By applying a mechanical impact in the mixing, the particles of the external additive, etc., are suppressed from releasing from the surface of the toner base particles.

A method for applying a mechanical impulsive force is not particularly limited and can be suitably selected to suit to a particular application. For example, the method may be performed by using blades rotating at a high speed, or by accelerating the particles in a high-speed airflow to allow the particles collide with each other or with a collision plate.

An apparatus used to perform the method is not particularly limited and can be suitably selected to suit to a particular application. Specific examples of such an apparatus include, but are not limited to, ONG MILL (manufactured by Hosokawa Micron Corporation), a modified I-TYPE MILL (manufactured by Nippon Pneumatic Mfg. Co., Ltd.) in which the pulverizing air pressure is reduced, HYBRIDIZATION SYSTEM (manufactured by Nara Machinery Co., Ltd.), KRYPTON SYSTEM (manufactured by Kawasaki Heavy Industries, Ltd.), and an automatic mortar.

Developer

A developer according to an embodiment of the present invention comprises at least the above-described toner and optionally other components such as a carrier.

The developer has excellent transferability and chargeability and is capable of reliably forming high-quality image. The developer may be either one-component developer or two-component developer. To be used for high-speed printers corresponding to recent improvement in information processing speed, two-component developer is preferred, because the lifespan of the printer can be extended.

In the case of one-component developer, even when toner supply and toner consumption are repeatedly performed, the particle diameter of the toner fluctuates very little. In addition, neither toner filming on a developing roller nor toner fusing to a layer thickness regulating member (e.g., a blade for forming a thin layer of toner) occurs. Thus, even when the developer is used (stirred) in a developing device for a long period of time, developability and image quality remain good and stable.

In the case of two-component developer, even when toner supply and toner consumption are repeatedly performed for a long period of time, the particle diameter of the toner fluctuates very little. Thus, even when the developer is stirred in a developing device for a long period of time, developability and image quality remain good and stable.

The two-component developer may be prepared by mixing the above toner with a carrier. The proportion of the carrier in the two-component developer is not particularly limited and can be suitably selected to suit to a particular application, but is preferably from 90% to 98% by mass, more preferably from 93% to 97% by mass.

Carrier

The carrier is not particularly limited and can be suitably selected to suit to a particular application, but the carrier preferably comprises a core material and a resin layer covering the core material.

Core Material

The core material is not particularly limited and can be suitably selected to suit to a particular application. Specific examples thereof include, but are not limited to, manganese-strontium or manganese-magnesium materials having a magnetization of from 50 to 90 emu/g. For securing image density, high magnetization materials, such as iron powders having a magnetization of 100 emu/g or more and magnetites having a magnetization of from 75 to 120 emu/g, are preferred. Additionally, low magnetization materials, such as copper-zinc materials having a magnetization of from 30 to 80 emu/g, are preferred for improving image quality, because such materials are capable of reducing the impact of the magnetic brush to a photoconductor.

Each of these can be used alone or in combination with others.

The volume average particle diameter of the core material is not particularly limited and can be suitably selected to suit to a particular application, but is preferably from 10 to 150 μm, more preferably from 40 to 100 μm. When the volume average particle diameter is less than 10 μm, the amount of fine particles in the carrier is so large that the magnetization per carrier particle is lowered to cause carrier scattering. When the volume average particle diameter is more than 150 μm, the specific surface area is so small that toner scattering may occur. Therefore, reproducibility of solid portions in full-color images may be lowered.

Resin Layer

The material of the resin layer is not particularly limited and can be suitably selected to suit to a particular application. Specific examples thereof include, but are not limited to, amino resin, polyvinyl resin, polystyrene resin, polyhalogenated olefin, polyester resin, polycarbonate resin, polyethylene, polyvinyl fluoride, polyvinylidene fluoride, polytrifluoroethylene, polyhexafluoropropylene, copolymer of vinylidene fluoride with an acrylic monomer, copolymer of vinylidene fluoride with vinyl fluoride, fluoroterpolymer (e.g., copolymer of tetrafluoroethylene, vinylidene fluoride, and a monomer free of fluoro group), and silicone resin.

Each of these can be used alone or in combination with others.

The amino resin is not particularly limited and can be suitably selected to suit to a particular application. Examples thereof include, but are not limited to, urea-formaldehyde resin, melamine resin, benzoguanamine resin, urea resin, polyamide resin, and epoxy resin.

The polyvinyl resin is not particularly limited and can be suitably selected to suit to a particular application. Examples thereof include, but are not limited to, acrylic resin, polymethyl methacrylate, polyacrylonitrile, polyvinyl acetate, polyvinyl alcohol, and polyvinyl butyral.

The polystyrene resin is not particularly limited and can be suitably selected to suit to a particular application. Examples thereof include, but are not limited to, polystyrene and styrene-acryl copolymer.

The polyhalogenated olefin is not particularly limited and can be suitably selected to suit to a particular application. Examples thereof include, but are not limited to, polyvinyl chloride.

The polyester resin is not particularly limited and can be suitably selected to suit to a particular application. Examples thereof include, but are not limited to, polyethylene terephthalate and polybutylene terephthalate.

The resin layer may contain a conductive powder, as necessary. The conductive powder is not particularly limited and can be suitably selected to suit to a particular application. Examples thereof include, but are not limited to, metal powder, carbon black, titanium oxide, tin oxide, and zinc oxide. Preferably, the conductive powder has an average particle diameter of 1 μm or less. When the average particle diameter is more than 1 μm, it may be difficult to control electrical resistance.

The resin layer can be formed by, for example, dissolving a silicone resin, etc., in a solvent to prepare a coating liquid and uniformly coating the surface of the core material with the coating liquid by a known coating method, followed by drying and baking.

The coating method is not particularly limited and can be suitably selected to suit to a particular application. Specific examples thereof include, but are not limited to, dipping, spraying, and brush coating.

The solvent is not particularly limited and can be suitably selected to suit to a particular application. Specific examples thereof include, but are not limited to, toluene, xylene, methyl ethyl ketone, methyl isobutyl ketone, and butyl acetate cellosolve.

The baking method may be either an external heating method or an internal heating method, such as a method using a stationary electric furnace, fluid electric furnace, rotary electric furnace, or burner furnace, and a method using microwave.

The proportion of the resin layer in the carrier is not particularly limited and can be suitably selected to suit to a particular application, but is preferably from 0.01% to 5.0% by mass. When the proportion is less than 0.01% by mass, a uniform resin layer may not be formed on the surface of the core material. When the proportion exceeds 5.0% by mass, carrier particles may fuse with each other due to their thick resin layers and may lose uniformity.

Image Bearer

The material, shape, structure, size, and the like of the image bearer are not particularly limited and can be suitably selected to suit to a particular application.

The shape of the image bearer may be, for example, a drum shape, a belt shape, a flat plate shape, or a sheet shape.

The size of the image bearer is not particularly limited and can be suitably selected to suit to a particular application. Preferably, the image bearer is in a size that is generally used.

The material of the image bearer is not particularly limited and can be suitably selected to suit to a particular application. Examples thereof include, but are not limited to, metals, plastics, and ceramics.

Toner Accommodating Unit

In the present disclosure, a toner accommodating unit refers to a unit having a function of accommodating toner and accommodating the toner. The toner accommodating unit may be in the form of, for example, a toner accommodating container, a developing device, or a process cartridge. The toner accommodating container refers to a container accommodating the toner. The developing device refers to a device that accommodates toner and is configured to develop an electrostatic latent image into a toner image with the toner. The process cartridge refers to a combined body of an electrostatic latent image bearer (also referred to as an image bearer) with a developing unit accommodating the toner that is detachably mountable on an image forming apparatus. The process cartridge may further include at least one of a charger, an irradiator, and a cleaner.

When the toner accommodating unit according to an embodiment of the present invention is mounted on an image forming apparatus, an image is formed with the toner according to an embodiment of the present invention. Therefore, the toner is prevented from scattering and can be fixed at low temperatures.

Image Forming Method and Image Forming Apparatus

An image forming method according to an embodiment of the present invention includes: an electrostatic latent image forming process in which an electrostatic latent image is formed on an electrostatic latent image bearer; a developing process in which the electrostatic latent image is developed with the toner or developer according to some embodiments of the present invention to form a visible image; a transfer process in which the visible image is transferred onto a recording medium; and a fixing process in which the visible image is fixed on the recording medium. The image forming method may further include other processes such as a neutralization process, a cleaning process, a recycle process, and a control process, if needed.

An image forming apparatus according to an embodiment of the present invention includes: an electrostatic latent image bearer; an electrostatic latent image forming device configured to form an electrostatic latent image on an electrostatic latent image bearer; a developing device containing the toner or developer according to some embodiments of the present invention, configured to develop the electrostatic latent image with the toner or developer to form a visible image; a transfer device configured to transfer the visible image onto a recording medium; and a fixing device configured to fix the visible image on the recording medium. The image forming apparatus may further include other devices such as a neutralizer, a cleaner, a recycler, and a controller, if needed. Details are described below.

Electrostatic Latent Image Forming Process and Electrostatic Latent Image Forming Device The electrostatic latent image forming process is a process in which an electrostatic latent image is formed on an electrostatic latent image bearer.

The electrostatic latent image bearer (also referred to as "electrophotographic photoconductor" or "photoconductor") is not limited in material, shape, structure, and size, and can be appropriately selected from known materials. As the shape, drum-like shape is preferred. Specific examples of the materials include, but are not limited to, inorganic photoconductors such as amorphous silicon and selenium, and organic photoconductors (OPC) such as polysilane and phthalopolymethine. Among these, organic photoconductors (OPC) are preferred for producing images with a higher definition.

The formation of the electrostatic latent image can be conducted by, for example, uniformly charging a surface of the electrostatic latent image bearer and irradiating the surface with light containing image information by the electrostatic latent image forming device. The electrostatic latent image forming device may include at least a charger to uniformly charge a surface of the electrostatic latent image bearer and an irradiator to irradiate the surface of the electrostatic latent image bearer with light containing image information.

The charging can be conducted by, for example, applying a voltage to a surface of the electrostatic latent image bearer by the charger.

The charger is not particularly limited and can be suitably selected to suit to a particular application. Specific examples thereof include, but are not limited to, contact chargers equipped with a conductive or semiconductive roller, brush, film, or rubber blade and non-contact chargers employing corona discharge such as corotron and scorotron.

Preferably, the charger is disposed in or out of contact with the electrostatic latent image bearer and configured to charge the surface of the electrostatic latent image bearer by applying direct-current and alternating-current voltages in superimposition thereto.

Preferably, the charger is a charging roller disposed close to but out of contact with the electrostatic latent image bearer via a gap tape and configured to charge the surface of the electrostatic latent image bearer by applying direct-current and alternating-current voltages in superimposition thereto.

The irradiation can be conducted by, for example, irradiating the surface of the electrostatic latent image bearer with light containing image information by the irradiator.

The irradiator is not particularly limited and can be suitably selected to suit to a particular application as long as it can irradiate the surface of the electrostatic latent image bearer charged by the charger with light containing information of an image to be formed. Specific examples thereof include, but are not limited to, various irradiators of radiation optical system type, rod lens array type, laser optical type, and liquid crystal shutter optical type.

The irradiation can also be conducted by irradiating the back surface of the electrostatic latent image bearer with light containing image information.

Developing Process and Developing Device

The developing process is a process in which the electrostatic latent image is developed with the toner to form a visible image.

The visible image can be formed by developing the electrostatic latent image with the toner by the developing device.

Preferably, the developing device includes a developing unit storing the toner and is configured to apply the toner to the electrostatic latent image by contacting or without contacting the electrostatic latent image. More preferably, the developing unit is equipped with a container containing the toner.

The developing device may be either a monochrome developing device or a multicolor developing device. Preferably, the developing device includes a stirrer that frictionally stirs and charges the toner and a rotatable magnet roller.

In the developing device, toner particles and carrier particles are mixed and stirred. The toner particles are charged by friction and retained on the surface of the rotating magnet roller, thus forming magnetic brush. The magnet roller is disposed proximity to the electrostatic latent image bearer (photoconductor), so that a part of the toner particles composing the magnetic brush formed on the surface of the magnet roller are moved to the surface of the electrostatic latent image bearer (photoconductor) by an electric attractive force. As a result, the electrostatic latent image is developed with the toner particles and a visible image is formed with the toner particles on the surface of the electrostatic latent image bearer (photoconductor).

Transfer Process and Transfer Device

The transfer process is a process in which the visible image is transferred onto a recording medium. It is preferable that the visible image is primarily transferred onto an intermediate transferor and then secondarily transferred onto the recording medium. Specifically, the transfer process includes a primary transfer process in which the visible image formed with two or more toners with different colors, preferably in full colors, is transferred onto the intermediate transferor to form a composite transferred image, and a secondary transfer process in which the composite transferred image is transferred onto the recording medium.

In the transfer process, the visible image may be transferred by charging the electrostatic latent image bearer (photoconductor) by a transfer charger. The transfer process can be performed by the transfer device. Preferably, the transfer device includes a primary transfer device to transfer the visible image onto an intermediate transferor to form a composite transfer image, and a secondary transfer device to transfer the composite transfer image onto a recording medium.

The intermediate transferor is not particularly limited and can be suitably selected from known transferors to suit to a particular application. Preferred examples thereof include, but are not limited to, a transfer belt.

The transfer device (including the primary transfer device and the secondary transfer device) preferably includes a transferer configured to separate the visible image formed on the electrostatic latent image bearer (photoconductor) to the recording medium side by charging. The number of the transfer devices is at least one, and may be two or more.

Specific examples of the transferer include, but are not limited to, a corona transferer utilizing corona discharge, a transfer belt, a transfer roller, a pressure transfer roller, and an adhesive transferer.

The recording medium is not limited to any particular material and conventional recording media (recording paper) can be used.

Fixing Process and Fixing Device

The fixing process is a process in which a visible image transferred onto the recording medium is fixed thereon by the fixing device. The fixing process may be conducted every time each color developer is transferred onto the recording medium. Alternatively, the fixing process may be conducted at once after all color developers are superimposed on one another on the recording medium.

The fixing device is not particularly limited and can be suitably selected to suit to a particular application, but preferably includes a heat-pressure member. Specific examples of the heat-pressure member include, but are not limited to, a combination of a heat roller and a pressure roller; and a combination of a heat roller, a pressure roller, and an endless belt.

Preferably, the fixing device includes a heater equipped with a heat generator, a film in contact with the heater, and a pressurizer pressed against the heater via the film, and is configured to allow a recording medium having an unfixed image thereon to pass through between the film and the pressurizer so that the unfixed image is fixed on the recoding medium by application of heat. The heating temperature of the heat-pressure member is preferably from 80° C. to 200° C.

The fixing device may be used together with or replaced with an optical fixer according to the purpose.

The neutralization process is a process in which a neutralization bias is applied to the electrostatic latent image bearer to neutralize the electrostatic latent image bearer, and is preferably conducted by a neutralizer.

The neutralizer is not particularly limited and can be appropriately selected from known neutralizers as long as it is capable of applying a neutralization bias to the electrostatic latent image bearer. Preferred examples thereof include, but are not limited to, a neutralization lamp.

The cleaning process is a process in which residual toner particles remaining on the electrostatic latent image bearer are removed, and is preferably conducted by a cleaner.

The cleaner is not particularly limited and can be appropriately selected from known cleaners as long as it is capable of removing residual toner particles remaining on the electrostatic latent image bearer. Preferred examples thereof include, but are not limited to, magnetic brush cleaner, electrostatic brush cleaner, magnetic roller cleaner, blade cleaner, brush cleaner, and web cleaner.

The recycle process is a process in which the toner particles removed in the cleaning process are recycled for the developing device, and is preferably conducted by a recycler. The recycler is not particularly limited. Specific examples thereof include, but are not limited to, a conveyor.

The control process is a process in which the above-described processes are controlled, and is preferably conducted by a controller.

The controller is not particularly limited and can be suitably selected to suit to a particular application as long as it is capable of controlling the above-described processes. Specific examples of the controller include, but are not limited to, a sequencer and a computer.

Figure 4:
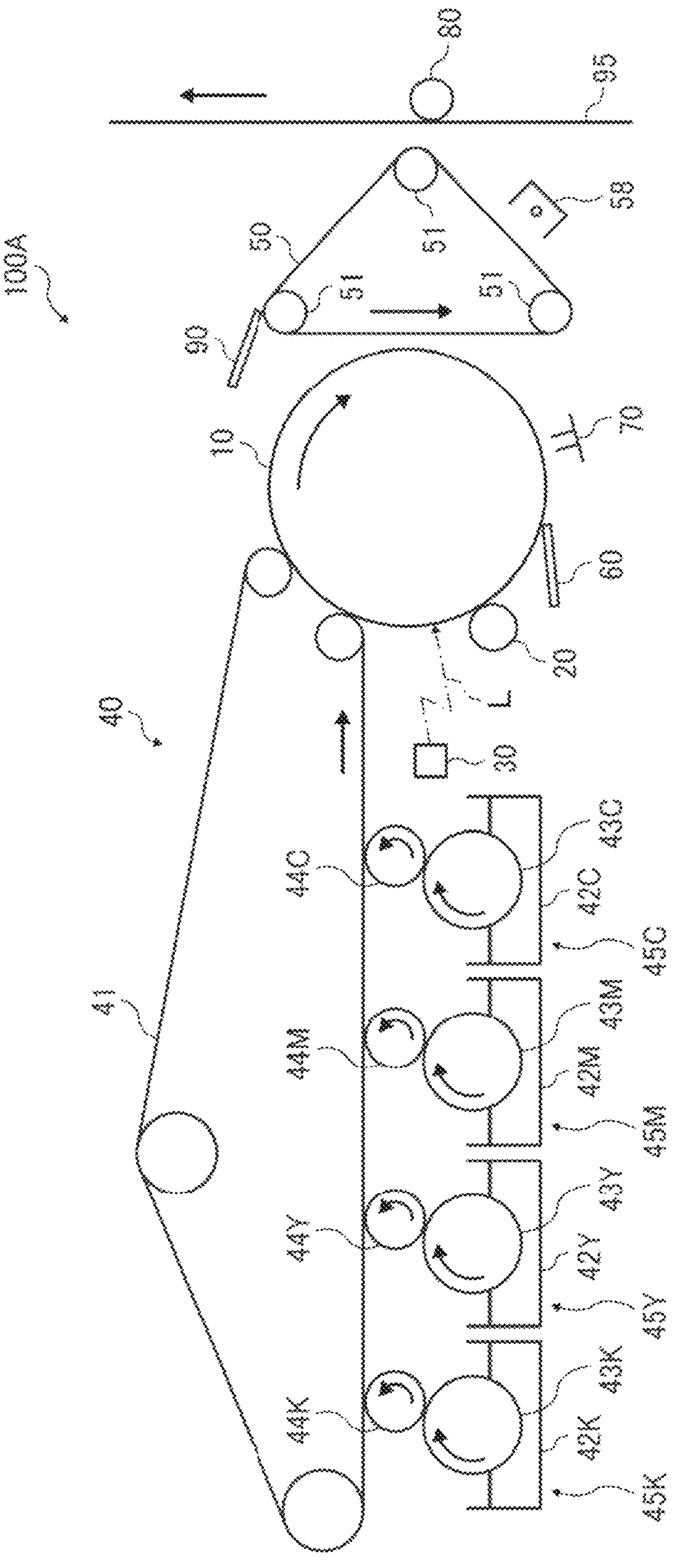
FIG. 4 is a schematic diagram illustrating an image forming apparatus according to an embodiment of the present invention.

FIG. 4 is a schematic diagram illustrating a first example of the image forming apparatus according to an embodiment of the present invention. An image forming apparatus 100A includes a photoconductor drum 10, a charging roller 20, an irradiator 30, a developing device 40, an intermediate transfer belt 50, a cleaner 60 having a cleaning blade, and a neutralization lamp 70.

The intermediate transfer belt 50 is in the form of an endless belt and is stretched taut by three rollers 51 disposed inside the loop of the endless belt. The intermediate transfer belt 50 is movable in the direction indicated by arrow in FIG. 4. One or two of the three rollers 51 also function(s) as transfer bias roller(s) capable of applying a transfer bias (primary transfer bias) to the intermediate transfer belt 50. A cleaner 90 having a cleaning blade is disposed in the vicinity of the intermediate transfer belt 50. A transfer roller 80 capable of applying a transfer bias (secondary transfer bias) to a transfer sheet 95, for transferring the toner image thereon, is disposed facing the intermediate transfer belt 50.

Around the intermediate transfer belt 50, a corona charger 58 that gives charge to the toner image transferred onto the intermediate transfer belt 50 is disposed between a contact portion of the intermediate transfer belt 50 with the photoconductor drum 10 and another contact portion of the intermediate transfer belt 50 with the transfer sheet 95 in the direction of rotation of the intermediate transfer belt 50.

The developing device 40 includes a developing belt 41, and a black developing unit 45K, a yellow developing unit 45Y, a magenta developing unit 45M, and a cyan developing unit 45C each disposed around the developing belt 41. The black, yellow, magenta, and cyan developing units 45K, 45Y, 45M, and 45C include respective developer containers 42K, 42Y, 42M, and 42C, respective developer supplying rollers 43K. 43Y, 43M, and 43C, and respective developing rollers (developer bearers) 44K, 44Y, 44M, and 44C. The developing belt 41 is in the form of an endless belt and stretched taut by multiple belt rollers. The developing belt 41 is movable in the direction indicated by arrow in FIG. 4. A part of the developing belt 41 is in contact with the photoconductor drum 10.

An image forming operation performed by the image forming apparatus 100A is described below. First, the charging roller 20 uniformly charges a surface of the photoconductor drum 10 and the irradiator 30 irradiates the surface of the photoconductor drum 10 with light L to form an electrostatic latent image. The electrostatic latent image formed on the photoconductor drum 10 is developed with toner supplied from the developing device 40 to form a toner image. The toner image formed on the photoconductor drum 10 is primarily transferred onto the intermediate transfer belt 50 by a transfer bias applied from the roller(s) 51 and then secondarily transferred onto the transfer sheet 95 by a transfer bias applied from the transfer roller 80. After the toner image has been transferred onto the intermediate transfer belt 50, the surface of the photoconductor drum 10 is cleaned by removing residual toner particles by the cleaner 60 and then neutralized by the neutralization lamp 70.

Figure 5:
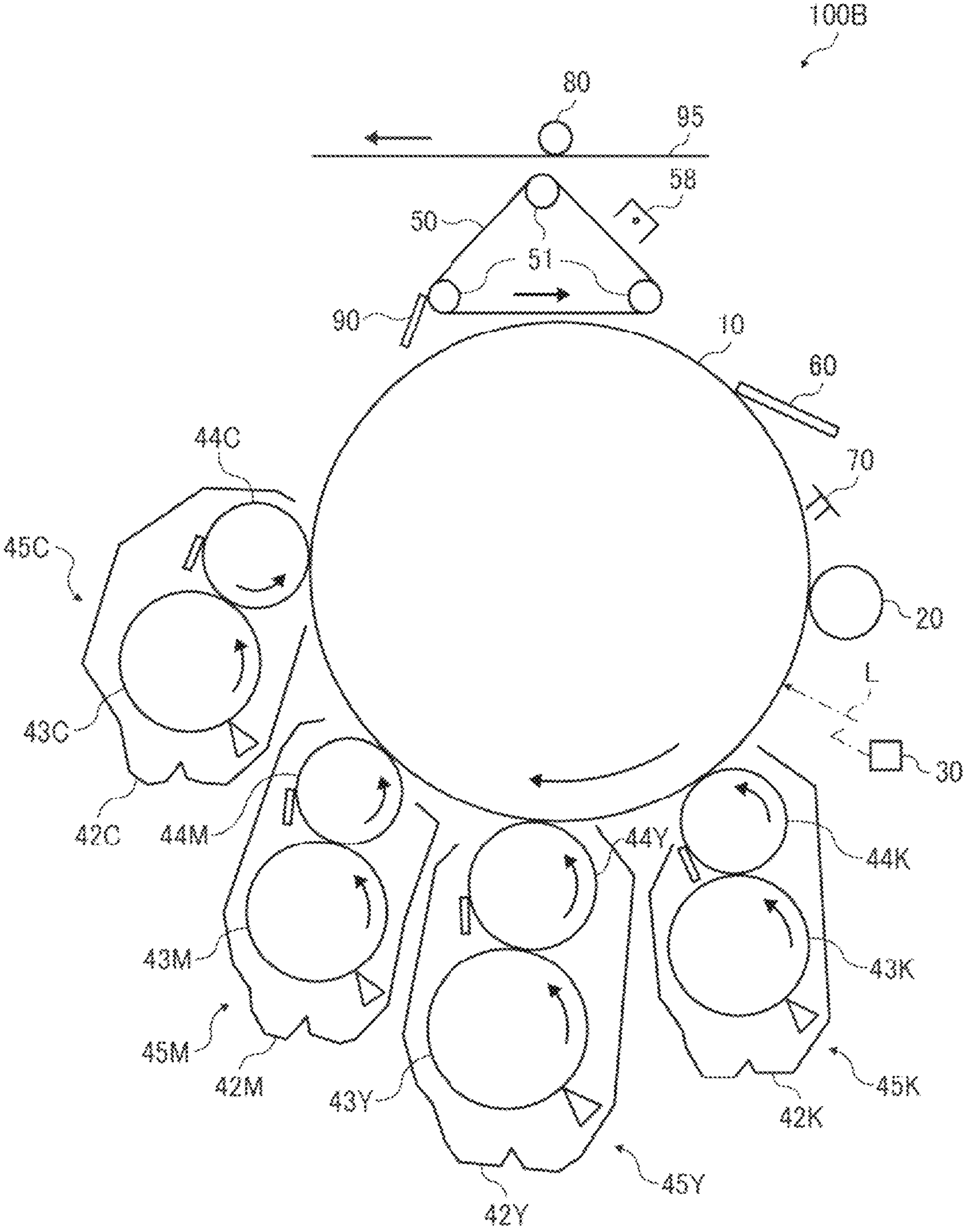
FIG. 5 is a schematic diagram illustrating an image forming apparatus according to an embodiment of the present invention.

FIG. 5 is a schematic diagram illustrating a second example of the image forming apparatus according to an embodiment of the present invention. An image forming apparatus 100B has a similar configuration to the image forming apparatus 100A except that the developing belt 41 is omitted and the black developing unit 45K, the yellow developing unit 45Y, the magenta developing unit 45M, and the cyan developing unit 45C are disposed facing the circumferential surface of the photoconductor drum 10.

Figure 6:
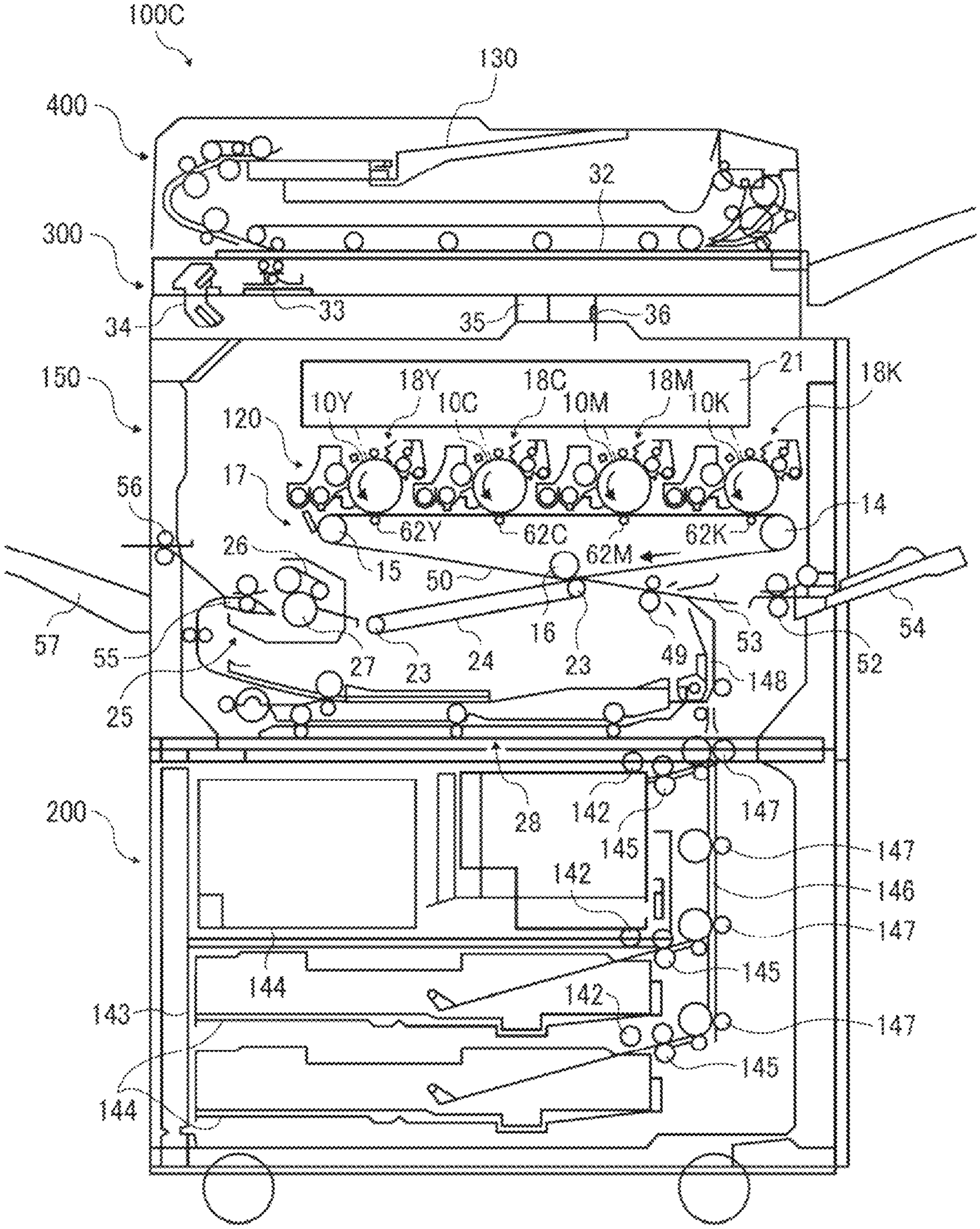
FIG. 6 is a schematic diagram illustrating an image forming apparatus according to an embodiment of the present invention.

FIG. 6 is a schematic diagram illustrating a third example of the image forming apparatus according to an embodiment of the present invention. An image forming apparatus 100C is a tandem-type full-color image forming apparatus that includes a copier main body 150, a sheet feeding table 200, a scanner 300, and an automatic document feeder (ADF) 400.

An intermediate transfer belt 50, disposed at the center of the copier main body 150, is in the form of an endless belt and stretched taut by three support rollers 14, 15, and 16. The intermediate transfer belt 50 is movable in the direction indicated by arrow in FIG. 6. In the vicinity of the roller 15, a cleaner 17 having a cleaning blade is disposed that removes residual toner particles remaining on the intermediate transfer belt 50 from which the toner image has been transferred onto a recording sheet. Four image forming units 18Y, 18C, 18M, and 18K for respectively forming yellow, cyan, magenta, and black images are arranged in tandem along the conveyance direction and facing a part of the intermediate transfer belt 50 stretched between the support rollers 14 and 15, thus forming a tandem unit 120.

In the vicinity of the tandem unit 120, an irradiator 21 is disposed. On the opposite side of the tandem unit 120 relative to the intermediate transfer belt 50, a secondary transfer belt 24 is disposed. The secondary transfer belt 24 is in the form of an endless belt and stretched taut with a pair of rollers 23. A recording sheet conveyed onto the secondary transfer belt 24 is brought into contact with the intermediate transfer belt 50 at between the rollers 16 and 23.

In the vicinity of the secondary transfer belt 24, a fixing device 25 is disposed. The fixing device 25 includes a fixing belt 26 and a pressing roller 27. The fixing belt 26 is in the form of an endless belt and stretched taut between a pair of rollers. The pressing roller 27 is pressed against the fixing belt 26. In the vicinity of the secondary transfer belt 24 and the fixing device 25, a sheet reversing device 28 is disposed for reversing the recording sheet so that images can be formed on both surfaces of the recording sheet.

A full-color image forming operation performed by the image forming apparatus 100C is described below. First, a document is set on a document table 130 of the automatic document feeder 400. Alternatively, a document is set on a contact glass 32 of the scanner 300 while the automatic document feeder 400 is lifted up, followed by holding down of the automatic document feeder 400. As a start switch is pressed, in a case in which the document is set on the automatic document feeder 400, the scanner 300 starts driving after the document is moved onto the contact glass 32. On the other hand, in a case in which the document is set on the contact glass 32, the scanner 300 immediately starts driving. A first traveling body 33 equipped with a light source and a second traveling body 34 equipped with a mirror then start traveling. The first traveling body 33 directs light to the document and the second traveling body 34 reflects light reflected from the document toward a reading sensor 36 through an imaging forming lens 35. Thus, the document is read by the reading sensor 36 and converted into image information of yellow, magenta, cyan, and black.

Figure 7:
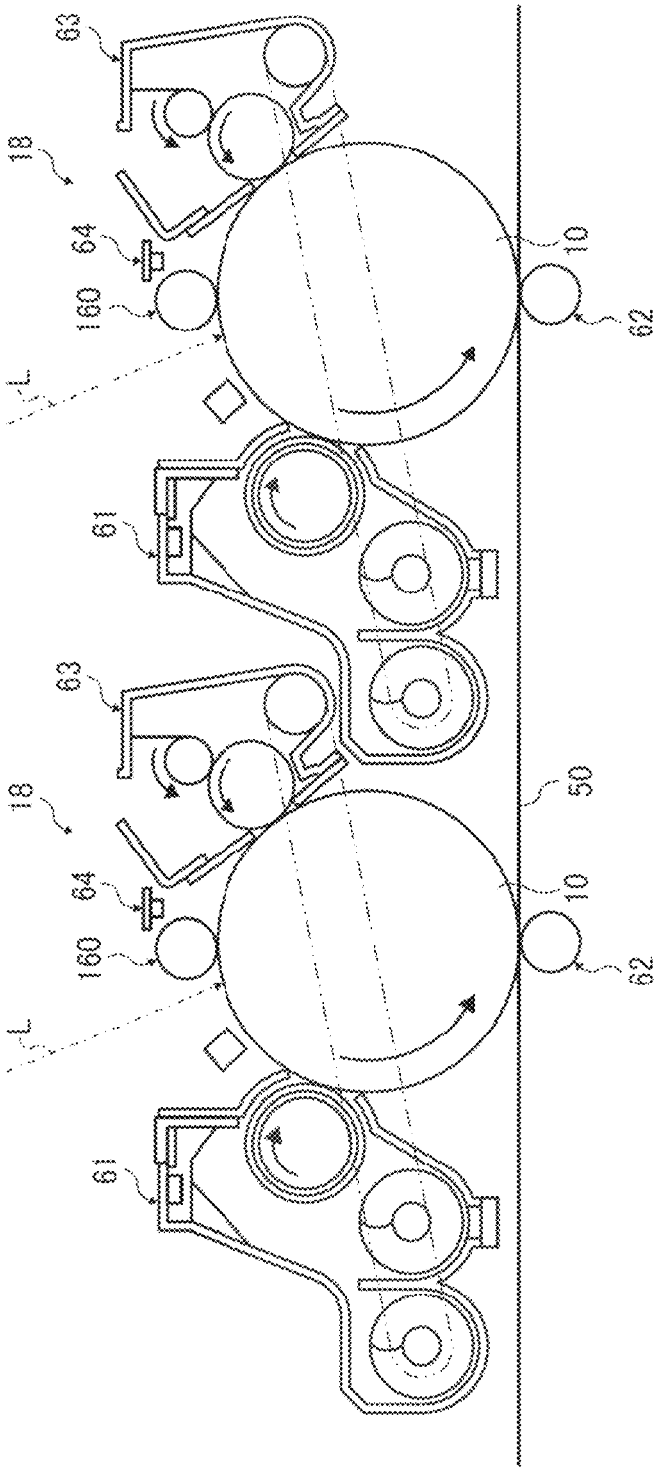
FIG. 7 is a schematic diagram illustrating an image forming apparatus according to an embodiment of the present invention.

The image information of each color is transmitted to the corresponding image forming unit 18Y, 18C. 18M, or 18K to form a toner image of each color. Referring to FIG. 7, each image forming unit 18 includes a photoconductor drum 10, a charging roller 160 to uniformly charge the photoconductor drum 10, a developing device 61 to develop an electrostatic latent image formed on the photoconductor drum 10 into a toner image with a developer of each color, a transfer roller 62 to transfer the toner image onto the intermediate transfer belt 50, a cleaner 63 having a cleaning blade, and a neutralization lamp 64.

The toner images formed in the image forming unit 18Y, 18C, 18M, and 18K are primarily transferred in a successive and overlapping manner onto the intermediate transfer belt 50 stretched and moved by the support rollers 14, 15, and 16. Thus, a composite toner image is formed on the intermediate transfer belt 50.

At the same time, in the sheet feeding table 200, one of sheet feed rollers 142 starts rotating to feed recording sheets from one of sheet feed cassettes 144 in a sheet bank 143. One of separation rollers 145 separates the recording sheets one by one and feeds them to a sheet feed path 146. Feed rollers 147 feed each sheet to a sheet feed path 148 in the copier main body 150. The sheet is stopped by striking a registration roller 49. Alternatively, recording sheets may be fed from a manual feed tray 54. In this case, a separation roller 52 separates the sheets one by one and feeds it to a manual sheet feeding path 53. The sheet is stopped upon striking the registration roller 49.

The registration roller 49 is generally grounded. Alternatively, the registration roller 49 may be applied with a bias for the purpose of removing paper powders from the sheet. The registration roller 49 starts rotating in synchronization with an entry of the composite toner image formed on the intermediate transfer belt 50 to between the intermediate transfer belt 50 and the secondary transfer belt 24, so that the recording sheet is fed thereto and the composite toner image can be secondarily transferred onto the recording sheet. Residual toner particles remaining on the intermediate transfer belt 50 after the composite toner image has been transferred are removed by the cleaner 17.

The recording sheet having the composite toner image thereon is fed by the secondary transfer belt 24 to the fixing device 25, and the composite toner image is fixed on the recording sheet. A switch claw 55 switches sheet feed paths so that the recording sheet is ejected by an ejection roller 56 and stacked on a sheet ejection tray 57. Alternatively, the switch claw 55 may switch sheet feed paths so that the recording sheet is introduced into the sheet reversing device 28 and gets reversed. After another image is formed on the back side of the recording sheet, the recording sheet is ejected by the ejection roller 56 on the sheet ejection tray 57.

Figure 8:
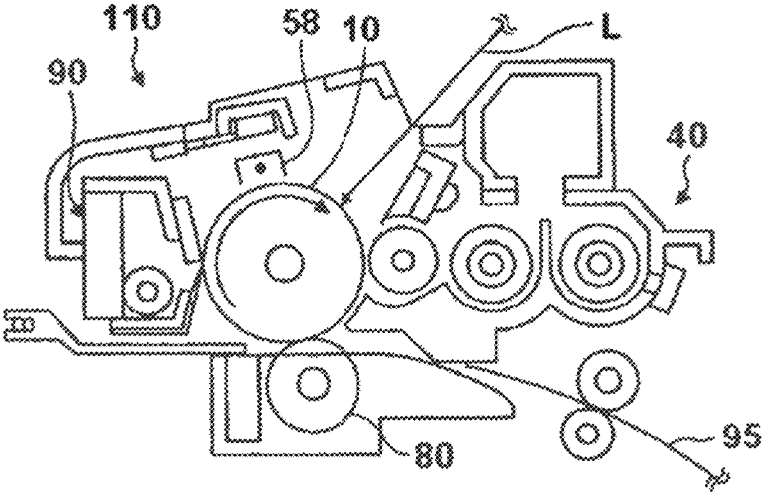
FIG. 8 is a schematic diagram illustrating a process cartridge according to an embodiment of the present invention.

FIG. 8 is a schematic diagram illustrating a process cartridge according to an embodiment of the present invention. A process cartridge 110 includes a photoconductor drum 10, a corona charger 58, a developing device 40, a transfer roller 80, and a cleaner 90.

EXAMPLES

The embodiments of the present invention are further described in detail with reference to the following Examples but are not limited to these Examples. In the following descriptions, "parts" and "%" represent "parts by mass" and "% by mass", respectively.

Production of Toners

Production Examples of Crystalline Polyester Resin

Synthesis of Crystalline Polyester Resin 1

A reaction vessel equipped with a nitrogen introducing tube, a dewatering tube, a stirrer, and a thermocouple was charged with sebacic acid and 1,10-decanediol. The molar ratio of hydroxyl groups to carboxyl groups was 0.9. Furthermore, 500 ppm (based on all the monomers) of titanium tetraisopropoxide was added to the vessel. Next, a reaction was performed at 180° C. for 10 hours and subsequently at 200° C. for 3 hours. Further, a reaction was performed under a reduced pressure of 8.3 kPa for 2 hours. Thus, a crystalline polyester resin 1 was prepared. The crystalline polyester resin 1 was found to have a melting point of 62° C. and a weight average molecular weight of 28,000.

Synthesis of Crystalline Polyester Resin 2

A crystalline polyester resin 2 was prepared in the same manner as in Synthesis of Crystalline Polyester Resin 1 except that the 1,10-decanediol was replaced with 1,2-ethylene glycol. The crystalline polyester resin 2 was found to have a melting point of 73° C. and a weight average molecular weight of 20,000.

Production Examples of Amorphous Polyester Resin

Synthesis of Amorphous Polyester Resin 1

In a 5-liter four-necked flask equipped with a nitrogen introducing tube, a dewatering tube, a stirrer, and a thermocouple, 1427.5 g of propylene oxide 2-mol adduct of bisphenol A, 20.2 g of trimethylolpropane, 512.7 g of terephthalic acid, and 119.9 g of adipic acid were put, and allowed to react at 230° C. under normal pressure for 10 hours and subsequently under reduced pressures of from 10 to 15 mmHg for 5 hours. Further, 41.0 g of trimellitic anhydride were further put in the flask and allowed to react at 180° C. under normal pressure for 3 hours. Thus, an amorphous polyester resin 1 was prepared.

The amorphous polyester resin 1 was found to have a weight average molecular weight of 10,000, a number average molecular weight of 2,900, a Tg of 57.5° C., and an acid value of 20 mgKOH/g.

Production Examples of Crystalline Polyester Resin Dispersion Liquid

Preparation of Crystalline Polyester Resin Dispersion Liquid 1

In a 2-liter metallic vessel, 100 g of the crystalline polyester resin 1 and 200 g of ethyl acetate were put, then heat-melted at 75° C., and rapidly cooled at a rate of 27° C./min in an ice water bath. After adding 500 mL of glass beads (having a diameter of 3 mm) to the vessel, the vessel contents were subjected to a pulverization treatment by a batch-type sand mill (manufactured by Kanpe Hapio Co., Ltd.) for 10 hours. Thus, a crystalline polyester resin dispersion liquid 1 was prepared.

Preparation of Crystalline Polyester Resin Dispersion Liquid 2

A crystalline polyester resin dispersion liquid 2 was prepared in the same manner as in Preparation of Crystalline Polyester Resin Dispersion Liquid 1 except that the crystalline polyester resin 1 was replaced with the crystalline polyester resin 2.

Production Examples of Non-Spherical Silica

Preparation of Silica Particles 1

In a 3-liter glass reactor equipped with a stirrer, a dropping funnel, and a thermometer, 693.0 parts of methanol, 46.0 parts of water, and 55.3 parts of 29% ammonia water were mixed. The temperature of the resulting solution was adjusted to 42° C., and 1,293.0 parts (8.5 mol) of tetramethoxysilane and 464.5 parts of 5.5% ammonia water were simultaneously added dropwise in the solution over a period of 6 hours and 4 hours, respectively, while stirring the solution. After the dropwise addition of tetramethoxysilane, the mixture was continuously stirred for 0.5 hours for hydrolysis to obtain a suspension of silica particles. Next, 547.4 parts (3.39 mol) of hexamethyldisilazane were put in the suspension at room temperature, and the mixture was heated to 120° C. and subjected to a reaction for 3 hours for trimethylsilylation of the silica particles. After that, the solvents were distilled off under reduced pressures. Thus, 553.0 parts of silica having an average primary particle diameter of 22 nm were obtained.

Next, by a sol-gel method using a treatment agent (hexamethyldisilazane), silica particles 1 as the non-spherical silica (having an average secondary particle diameter of 50 nm), in which primary particles of silica were coalesced with each other, were prepared at a firing temperature of 800° C. and a firing time of 3 hours. The silica primary particles and the treatment agent were mixed using a spray dryer. The treatment agent was prepared by adding 0.1 parts of a treatment aid (e.g., water or 1% acetic acid aqueous solution) to 1 part of methyltrimethoxysilane. Nx×1000/100, db50/db0, and the degree of coalescence are presented in Table 1.

Preparation of Silica Particles 2

Silica particles 2 as the non-spherical silica were produced in the same manner as in Preparation of Silica Particle 1 except that primary particles having an average primary particle diameter described in Table 1 were used and the degree of coalescence of the non-spherical silica was adjusted according to Table 1. The secondary average particle diameter, Nx×1000/100, db50/db10, and the degree of coalescence are presented in Table 1.

Preparation of Silica Particle 3

In a 3-liter glass reactor equipped with a stirrer, a dropping funnel, and a thermometer, 693.0 parts of methanol, 46.0 parts of water, and 55.3 parts of 29% ammonia water were mixed. The temperature of the resulting solution was adjusted to 42° C., and 1,293.0 parts (8.5 mol) of tetramethoxysilane and 464.5 parts of 5.4% ammonia water were simultaneously added dropwise in the solution over a period of 6 hours and 4 hours, respectively, while stirring the solution. After the dropwise addition of tetramethoxysilane, the mixture was continuously stirred for 0.5 hours for hydrolysis to obtain a suspension of silica particles. Next, 547.4 parts (3.39 mol) of hexamethyldisilazane were put in the suspension at room temperature, and the mixture was heated to 120° C. and subjected to a reaction for 3 hours for trimethylsilylation of the silica particles. After that, the solvents were distilled off under reduced pressures. Thus, 553.0 parts of silica particles 3 having an average primary particle diameter of 50 nm were obtained.

Preparation of Silica Particles 4

Silica particles 4 having an average particle diameter of 30 nm in an amount of 553.0 parts were prepared in the same manner as in Preparation of Silica Particle 3 except that the stirring temperature was changed to 40° C.

TABLE 1

| | Production of Coalesced Silica Particles | | | | | | | |
|---|---|---|---|---|---|---|---|---|
| | Primary Particles | | | Secondary Particle Diameter | | | | |
| | Average Particle | Production Conditions | | Average Particle | Nx × | | Average | Shape of Secondary |
| | Diameter [nm] | Manufacturing Method | Firing Temp. [° C.] | Diameter [nm] | 1000/100 [%] | Db50/ Db10 | Degree of Coalescence | Particles (or Primary Particles) |
| Silica Particles 1 | 22 | Sol-gel | 800 | 50 | 28 | 1.18 | 2.3 | Non-spherical |
| Silica Particles 2 | 30 | Sol-gel | 800 | 80 | 28 | 1.18 | 2.7 | Non-spherical |
| Silica Particles 3 | 50 | — | — | — | — | — | — | Spherical |
| Silica Particles 4 | 30 | — | — | — | — | — | — | Spherical |

Example 1

Preparation of Toner

Preparation of Oil Phase

Synthesis of Prepolymer

In a reaction vessel equipped with a condenser tube, a stirrer, and a nitrogen introducing tube, 682 parts of ethylene oxide 2-mol adduct of bisphenol A, 81 parts of propylene oxide 2-mol adduct of bisphenol A, 283 parts of terephthalic acid, 22 parts of trimellitic anhydride, and 2 parts of dibutyltin oxide were put, and allowed to react at 230° C. under normal pressure for 8 hours and subsequently under reduced pressures of from 10 to 15 mmHg for 5 hours. Thus, an intermediate polyester 1 was prepared. The intermediate polyester 1 was found to have a number average molecular weight of 2,100, a weight average molecular weight of 9,500, a Tg of 55° C., an acid value of 0.5 mgKOH/g, and a hydroxyl value of 51 mgKOH/g.

In another reaction vessel equipped with a condenser tube, a stirrer, and a nitrogen introducing tube, 410 parts of the intermediate polyester 1, 89 parts of isophorone diisocyanate, and 500 parts of ethyl acetate were put, then allowed to react at 100° C. for 5 hours. Thus, a prepolymer 1 was prepared. The proportion of free isocyanate in the prepolymer 1 was 1.53%.

Synthesis of Ketimine

In a reaction vessel equipped with a stirrer and a thermometer, 170 parts of isophoronediamine and 75 parts of methyl ethyl ketone were put and allowed to react at 50° C. for 5 hours. Thus, a ketimine compound 1 was prepared. The ketimine compound 1 was found to have an amine value of 418 mgKOH/g.

Preparation of Master Batch

First, 1,200 parts of water, 540 parts of a carbon black (PRINTEX 35 manufactured by Degussa AG, having a DBP oil absorption of 42 mL/100 mg and a pH of 9.5), and 1,200 parts of the amorphous polyester resin 1 were mixed using a HENSCHEL MIXER (manufactured by Mitsui Mining Co., Ltd.). The mixture was kneaded with a double roll at 150° C. for 30 minutes, thereafter rolled to cool, and pulverized using a pulverizer. Thus, a master batch 1 was prepared.

Preparation of Wax Dispersion Liquid

In a vessel equipped with a stirrer and a thermometer, 50 parts of a paraffin wax (HNP-9 manufactured by NIPPON SEIRO CO., LTD., a hydrocarbon wax having a melting point of 75° C. and a solubility parameter (SP) of 8.8) serving as a release agent 1 and 450 parts of ethyl acetate were put, then heated to 80° C. while being stirred, maintained at 80° C. for 5 hours, and cooled to 30° C. over a period of 1 hour. The resulting liquid was subjected to a dispersion treatment using a bead mill (ULTRAVISCOMILL manufactured by AIMEX CO., LTD.) filled with 80% by volume of zirconia beads having a diameter of 0.5 mm, at a liquid feeding speed of 1 kg/hour and a disc peripheral speed of 6 m/sec. This dispersing operation was repeated 3 times (3 passes). Thus, a wax dispersion liquid 1 was prepared.

Preparation of Oil Phase

In a vessel, 500 parts of the wax dispersion liquid 1, 200 parts of the prepolymer 1, 500 parts of the crystalline polyester resin dispersion liquid 1, 750 parts of the amorphous polyester resin 1, 100 parts of the master batch 1, and 2 parts of the ketimine compound 1 as a curing agent were mixed using a TK HOMOMIXER (manufactured by Tokushu Kika Kogyo Co., Ltd. (now PRIMIX Corporation)) at a revolution of 5,000 rpm for 60 minutes. Thus, an oil phase 1 was prepared.

Synthesis of Fine Organic Particle Emulsion (Fine Particle Dispersion Liquid)

In a reaction vessel equipped with a stirrer and a thermometer, 683 parts of water, 11 parts of a sodium salt of a sulfate of ethylene oxide adduct of methacrylic acid (ELEMINOL RS-30 manufactured by Sanyo Chemical Industries, Ltd.), 138 parts of styrene, 138 parts of methacrylic acid, and 1 part of ammonium persulfate were put and stirred at a revolution of 400 rpm for 15 minutes. Thus, a white emulsion was prepared. The white emulsion was heated to 75° C. and subjected to a reaction for 5 hours. A 1% aqueous solution of ammonium persulfate in an amount of 30 parts was further added to the emulsion, and the emulsion was aged at 75° C. for 5 hours. Thus, a fine particle dispersion liquid 1 was prepared, which was an aqueous dispersion liquid of a vinyl resin (i.e., a copolymer of styrene, methacrylic acid, and a sodium salt of a sulfate of ethylene oxide adduct of methacrylic acid). The volume average particle diameter of the fine particle dispersion liquid 1 was 0.14 μm when measured by an instrument LA-920 (manufactured by HORIBA, Ltd.). A part of the fine particle dispersion 1 was dried to isolate the resin component.

Preparation of Aqueous Phase

An aqueous phase 1 was prepared by stir-mixing 990 parts of water, 83 parts of the fine particle dispersion liquid 1, 37 parts of a 48.5% aqueous solution of sodium dodecyl diphenyl ether disulfonate (ELEMINOL MON-7 manufactured by Sanyo Chemical Industries, Ltd.), and 90 parts of ethyl acetate. The aqueous phase 1 was a milky white liquid.

Emulsification and Solvent Removal

In the vessel containing the oil phase 1, 1,200 parts of the aqueous phase 1 were put and mixed with the oil phase 1 using a TK HOMOMIXER at a revolution of 13,000 rpm for 20 minutes. Thus, an emulsion slurry 1 was prepared.

The emulsion slurry 1 was put in a vessel equipped with a stirrer and a thermometer and subjected to solvent removal at 30° C. for 8 hours and subsequently to aging at 45° C. for 4 hours. Thus, a dispersion slurry 1 was prepared.

Washing, Heating, and Drying

After 100 parts of the dispersion slurry 1 were filtered under reduced pressures:

(1) 100 parts of ion-exchange water were added to the resulted filter cake and mixed using a TK HOMOMIXER (at a revolution of 12,000 rpm for 10 minutes), followed by filtration.

(2) 100 parts of a 10% aqueous solution of sodium hydroxide were added to the filter cake of (1) and mixed using a TK HOMOMIXER (at a revolution of 12,000 rpm for 30 minutes), followed by filtration under reduced pressures.

(3) 100 parts of a 10% aqueous solution of hydrochloric acid were added to the filter cake of (2) and mixed using a TK HOMOMIXER (at a revolution of 12,000 rpm for 10 minutes, followed by filtration.

(4) 300 parts of ion-exchange water were added to the filter cake of (3) and mixed using a TK HOMOMIXER (at a revolution of 12,000 rpm for 10 minutes), followed by filtration. These operations (1) to (4) were repeated twice.

(5) 100 parts of ion-exchange water were added to the filter cake of (4) and mixed using a TK HOMOMIXER (at a revolution of 12,000 rpm for 10 minutes), then heated at 50° C. for 4 hours, followed by filtration, thus preparing a filter cake 1.

(6) The filter cake 1 was dried by a circulating air dryer at 45° C. for 48 hours and then filtered with a mesh having an opening of 75 μm. Thus, toner base particles 1 were prepared.

Next, 100 parts of the toner base particles 1 were mixed with 1.5 parts of the silica particles 1 and 1.0 part of a hydrophobic titanium oxide having an average primary particle diameter of 20 nm using a HENSCHEL MIXER (manufactured by Mitsui Mining Co., Ltd.) at a peripheral speed of 40 nm and a stirring time of 6 minutes. Thus, a toner 1 was prepared. The toner 1 was found to have a volume average particle diameter of 5.5 μm, the ratio of the volume average particle diameter to the number average particle diameter was 1.1, and the proportion of components having a volume average particle diameter of 2 μm or less was 4% by number.

Example 2

Toner base particles 2 were prepared in the same manner as in Example 1 except that the time period for the heat treatment at 50° C. for the dispersion slurry was changed from 4 hours to 6 hours. A toner 2 was prepared in the same manner as in Example 1 except for using the toner base particles 2.

An image forming apparatus was prepared and evaluations were conducted in the same manner as in Example 1 except that the toner 2 was used. The evaluation results are presented in Table 2.

Example 3

Toner base particles 3 were prepared in the same manner as in Example 1 except that the crystalline polyester resin dispersion liquid 1 was replaced with the crystalline polyester resin dispersion liquid 2. A toner 3 was prepared in the same manner as in Example 1 except for using the toner base particles 3.

An image forming apparatus was prepared and evaluations were conducted in the same manner as in Example 1 except that the toner 3 was used. The evaluation results are presented in Table 2.

Example 4

Toner base particles 4 were prepared in the same manner as in Example 1 except that 500 parts of the crystalline polyester resin dispersion liquid 1 were replaced with 600 parts of the crystalline polyester resin dispersion liquid 2 and the amount of the amorphous polyester resin 1 was changed from 750 parts to 650 parts. A toner 4 was prepared in the same manner as in Example 1 except for using the toner base particles 4.

An image forming apparatus was prepared and evaluations were conducted in the same manner as in Example 1 except that the toner 4 was used. The evaluation results are presented in Table 2.

Example 5

Toner base particles 5 were prepared in the same manner as in Example 1 except that the amount of the crystalline polyester resin dispersion liquid 1 was changed from 500 parts to 550 parts and the amount of the amorphous polyester resin 1 was changed from 750 parts to 700 parts.

A toner 5 was prepared in the same manner as in Example 1 except for using the toner base particles 5.

An image forming apparatus was prepared and evaluations were conducted in the same manner as in Example 1 except that the toner 5 was used. The evaluation results are presented in Table 2.

Example 6

Toner base particles 6 were prepared in the same manner as in Example 1 except that the amount of the crystalline polyester resin dispersion liquid 1 was changed from 500 parts to 520 parts and the amount of the amorphous polyester resin 1 was changed from 750 parts to 730 parts.

A toner 6 was prepared in the same manner as in Example 1 except for using the toner base particles 6 and replacing the silica particles 1 with the silica particles 2.

An image forming apparatus was prepared and evaluations were conducted in the same manner as in Example 1 except that the toner 6 was used. The evaluation results are presented in Table 2.

Example 7

Toner base particles 7 were prepared in the same manner as in Example 1 except that 500 parts of the crystalline polyester resin dispersion liquid 1 were replaced with 450 parts of the crystalline polyester resin dispersion liquid 2, the amount of the amorphous polyester resin 1 was changed from 750 parts to 800 parts, and the mix-stirring time by the HENSCHEL MIXER was changed from 6 minutes to 12 minutes. A toner 7 was prepared in the same manner as in Example 1 except for using the toner base particles 7 and replacing the silica particles 1 with the silica particles 2.

An image forming apparatus was prepared and evaluations were conducted in the same manner as in Example 1 except that the toner 7 was used. The evaluation results are presented in Table 2.

Comparative Example 1

A toner 8 was prepared in the same manner as in Example 5 except for replacing the silica particles 1 with the silica particles 3.

An image forming apparatus was prepared and evaluations were conducted in the same manner as in Example 1 except that the toner 8 was used. The evaluation results are presented in Table 3.

Comparative Example 2

A toner 9 was prepared in the same manner as in Comparative Example 1 except for replacing the silica particles 3 with the silica particles 4.

An image forming apparatus was prepared and evaluations were conducted in the same manner as in Example 1 except that the toner 9 was used. The evaluation results are presented in Table 3.

Comparative Example 3

Toner base particles 8 were prepared in the same manner as in Example 1 except that the amount of the crystalline polyester resin dispersion liquid 1 was changed from 500 parts to 0 part and the amount of the amorphous polyester resin 1 was changed from 750 parts to 1,250 parts.

A toner 10 was prepared in the same manner as in Example 1 except for using the toner base particles 8 and replacing the silica particles 1 with the silica particles 2.

An image forming apparatus was prepared and evaluations were conducted in the same manner as in Example 1 except that the toner 10 was used. The evaluation results are presented in Table 3.

Comparative Example 4

Toner base particles 9 were prepared in the same manner as in Example 3 except that the amount of the crystalline polyester resin dispersion liquid 2 was changed from 500 parts to 650 part and the amount of the amorphous polyester resin 1 was changed from 750 parts to 600 parts.

A toner 11 was prepared in the same manner as in Example 3 except for using the toner base particles 8 and replacing the silica particles 1 with the silica particles 2.

An image forming apparatus was prepared and evaluations were conducted in the same manner as in Example 1 except that the toner 11 was used. The evaluation results are presented in Table 3.

Comparative Example 5

A toner 12 was prepared in the same manner as in Comparative Example 4 except for replacing the silica particles 2 with the silica particles 4.

An image forming apparatus was prepared and evaluations were conducted in the same manner as in Example 1 except that the toner 12 was used. The evaluation results are presented in Table 3.

Comparative Example 6

A toner 13 was prepared in the same manner as in Comparative Example 3 except for replacing the silica particles 2 with the silica particles 4.

An image forming apparatus was prepared and evaluations were conducted in the same manner as in Example 1 except that the toner 13 was used. The evaluation results are presented in Table 3.

Evaluations

Measurement of Average Surface Roughness of Toner

In the present disclosure, a scanning probe microscope (SPM) is used to measure surface profile. Specifically, a surface profile of a sample is measured by scanning the sample with a probe of SPM having a tip diameter of about 10 nm to sense atomic forces acting between the probe and atoms on the sample surface. The resolution of this method is very high, and unevenness in surface profile in the Z direction with respect to the scanning direction (X direction) of the probe can be measured. In the present disclosure, the surfaces of the toner particles were scanned with the probe of SPM to measure surface profiles of the toner particles.

In the measurement, the probe of SPM scans an area of about 1-μm square along the surface in the vicinity of the top of a toner particle. The vertical displacement at this time is defined as information in the Z-axis direction. This measurement procedure is performed 3 to 10 times at different measurement positions or on different toner particles to grasp the state of the entire particles. It is practical to first evaluate a surface state from an image observed by SPM to confirm a surface portion to which the additive is attached, and then to perform quantitative analysis of surface unevenness. In the present disclosure, the unevenness (amplitude) is determined as the difference between a peak and a valley in the Z direction either in a small peak-and-valley cycle or a large peak-and-valley cycle in the profile obtained by the SPM measurement.

The conditions of the SPM analyzer are as follows.

Measurement device:

Atomic force microscope system DIMENSION ICON available from Bruker AXS

Measurement modes:

Peak Force QNM

OMCL-AC240TS

Material Si

Resonance frequency 70 [Hz]

Spring constant 2 [N/m] cantilever

The average surface roughness [nm] is the average of absolute values of differences (z(x,y)) in height from a standard surface to each measuring point in a reference area A that is 1-μm square.

$$Sa = \frac{1}{A}\int\int_A |z(x, y)|dxdy$$

Measurement of Liberation Amount of Silica by Ultrasonic Vibration Method

In the present disclosure, the liberation amount of the external additive is defined as a value obtained according to the measurement method described below.

That is, a liberation rate A (% by mass) of silica from the toner particles was measured according to the following procedure.

First, in a 500-mL beaker, 10 g of a polyoxyalkylene alkyl ether (NOIGEN ET-165 manufactured by DKS Co., Ltd.) and 300 mL of pure water were put and dispersed by ultrasonic waves for 1 hour to obtain a dispersion liquid A. After that, the dispersion liquid A was transferred to a 2-L volumetric flask and made up to 2 L. The resulting mixture was dissolved by ultrasonic waves for 1 hour to obtain a dispersion liquid B containing 0.5% of the polyoxyalkylene alkyl ether.

Next, 50 mL of the dispersion liquid B was poured into a 110-mL screw tube, and 3.75 g of a sample (toner) was further added thereto. The dispersion liquid B was stirred for 30 to 90 minutes until it got compatible with the toner, thus obtaining a liquid C. At this time, the revolution was reduced as much as possible to prevent formation of bubbles. After the toner had been sufficiently dispersed, the vibrating part of an ultrasonic homogenizer (VCX 750 manufactured by SONICS and Materials, Inc., at 20 kHz and 750 watts) was immersed in the liquid C by 2.5 cm and made to apply vibration for 1 minute at an output energy of 40%, thus preparing a liquid D.

The liquid D was put in a 50-mL centrifuge tube and centrifuged at 2,000 rpm for 2 minutes to obtain a supernatant liquid and a precipitate. The precipitate was poured into a Sepa-Rohto while being washed with 60 mL of pure water, and the washing water was removed by suction filtration.

The precipitate after filtration was put in a mini cup again, then 60 mL of pure water was poured into the mini cup and stirred with a spatula handle 5 times. At this time, the stirring was performed not violently. The washing water was removed by suction filtration again, then the toner remaining on the filter paper was collected and dried in a constant temperature bath at 40° C. for 8 hours. After drying, 3 g of the toner was collected and molded into a pellet having a diameter of 3 mm and a thickness of 2 mm using an automatic pressure molding machine (T-BRB-32 manufactured by MAEKAWA TESTING MACHINE MFG. Co., Ltd., with a load of 6.0 t and a pressure time of 60 seconds), thus preparing a post-treatment sample toner.

The untreated toner as an initial sample toner was molded into a pellet having a diameter of 3 mm and a thickness of 2 mm in the same manner as above, thus preparing a pre-treatment sample toner.

The pellet was subjected to a quantitative analysis by an X-ray fluorescence analyzer (ZSX-100e manufactured by Rigaku Corporation) to measure the number of parts of silica in the sample toner. A calibration curve to be used was previously prepared using sample toners having silica contents of 0.1 parts, 1 part, and 1.8 parts, respectively, with respect to 100 parts of each toner.

The liberation rate A (% by mass) of silica was calculated by the following formula.

Liberation rate $A$ (% by mass) of silica=[Amount (parts) of silica in pre-treatment sample toner−Amount (parts) of silica in post-treatment sample toner]/Amount of pre-treatment sample toner (parts)×100

Preferably, the toner of the present embodiment satisfies the following relation:

$$A<2.0 \quad \text{Formula (2)}$$

When A is 2.0 or more, the amount of the external additive liberated from the toner base particles is large, and toner filming resistance is poor.

A proportion B (% by mass) of the external additive in the toner was calculated by measuring the number of parts of silica in the pellet of the pre-treatment sample toner by a quantitative analysis performed by an X-ray fluorescence analyzer (ZSX-100e manufactured by Rigaku Corporation).

Preparation of Image Forming Apparatus

A cleaning blade was mounted on a process cartridge of a color multifunction peripheral (IMAGIO MP C4500 manufactured by Ricoh Co., Ltd.), the printer part of which having the same configuration as the image forming apparatus 100A illustrated in FIG. 4, to assemble an image forming apparatus in each Example or Comparative Example.

The cleaning blade was mounted on the image forming apparatus with a linear pressure of 15 g/cm and a cleaning angle of 79°. The image forming apparatus was equipped with a lubricant application device. The coefficient of static friction of the surface of the photoconductor was maintained at 0.2 or less during non-image forming periods by application of the lubricant to the photoconductor. The coefficient of static friction of the surface of the photoconductor was measured based on the Euler belt method described in, for example, paragraph [0046] of JP-H09-166919-A.

Cleanability

In a laboratory environment at 21° C. and 65% RH, an image chart having an image area ratio of 5% was output on 50,000 sheets (A4 size, lateral) at 3 prints/job using the image forming apparatus.

After that, in a laboratory environment at 32° C. and 54% RH, a test image chart having three vertical band patterns (in the sheet advancing direction) having a width of 43 mm was output on 100 sheets (A4 size, lateral). The resultant image was visually observed to confirm the presence or absence of an image abnormality due to defective cleaning, and cleanability was evaluated based on the following criteria.

Evaluation Criteria

A+: Toner particles having slipped through due to defective cleaning are not visually confirmed on either the print sheet or the photoconductor, and no streak-like toner slippage is confirmed even when the photoconductor is observed with a microscope in the longitudinal direction.

A: Toner particles having slipped through due to defective cleaning are not visually confirmed on either the print sheet or the photoconductor.

B: Toner particles having slipped through due to defective cleaning are slightly confirmed on the photoconductor but not confirmed on the print sheet.

C: Toner particles having slipped through due to defective cleaning are visually confirmed on either the print sheet or the photoconductor.

Filming Resistance

In a laboratory environment of 27° C. and 90% RH, a vertical band chart having an image area ratio of 30% was output on 5,000 sheets (A4 size, lateral) at 3 prints/job, then 5,000 blank sheets (A4 size, lateral) were output at 3 prints/job, and a halftone image was printed on one sheet, using the image forming apparatus. After that, the photoconductor was visually observed.

Evaluation Criteria

A+: No problem with the photoconductor. No problem in quality.

A: Filming is slightly observed in the direction of printing, but there is no problem in image quality. No problem.

B: Filming is observed on the photoconductor, but there is no problem in image quality. No problem.

C: Filming is clearly observed on the photoconductor, and there is a problem in image quality.

Evaluation results are presented in Tables 2 and 3.

TABLE 2

| Materials | | Example No. 1 | 2 | 3 | 4 | 5 | 6 | 7 |
|---|---|---|---|---|---|---|---|---|
| Toner No. | | Toner 1 | Toner 2 | Toner 3 | Toner 4 | Toner 5 | Toner 6 | Toner 7 |
| Toner Base Particles No. | | Toner Base Particles 1 | Toner Base Particles 2 | Toner Base Particles 3 | Toner Base Particles 4 | Toner Base Particles 5 | Toner Base Particles 6 | Toner Base Particles 7 |
| Silica Particles No. | | Silica Particles 1 | Silica Particles 1 | Silica Particles 1 | Silica Particles 1 | Silica Particles 1 | Silica Particles 2 | Silica Particles 2 |
| Average Surface Roughness | Ra [nm] | 20 | 12 | 150 | 198 | 40 | 30 | 148 |
| Silica Shape | Shape | Non-spherical | Non-spherical | Non-spherical | Non-spherical | Non-spherical | Non-spherical | Non-spherical |
| Silica Particle Diameter | Particle Diameter [nm] | 50 | 50 | 50 | 50 | 50 | 80 | 80 |
| Silica Liberation Amount | Liberation Rate A [mass %] | 2.14 | 2.2 | 1.52 | 1.35 | 2.1 | 1.98 | 1.12 |
| Silica Amount | Proportion B [mass %] | 1.5 | 1.5 | 1.5 | 1.5 | 1.5 | 1.5 | 1.5 |
| Evaluation Results | Filming Resistance | B | B | A | A+ | B | A | A+ |
| | Cleanability | B | B | B | B | A+ | A+ | A+ |

TABLE 3

| Materials | | Comparative Example No. 1 | 2 | 3 | 4 | 5 | 6 |
|---|---|---|---|---|---|---|---|
| Toner | | Toner 8 | Toner 9 | Toner 10 | Toner 11 | Toner 12 | Toner 13 |
| Toner Base Particles No. | | Toner Base Particles 5 | Toner Base Particles 5 | Toner Base Particles 8 | Toner Base Particles 9 | Toner Base Particles 9 | Toner Base Particles 8 |
| Silica Particles No. | | Silica Particles 3 | Silica Particles 4 | Silica Particles 2 | Silica Particles 2 | Silica Particles 4 | Silica Particles 4 |
| Average Surface Roughness | Ra [nm] | 40 | 40 | 10 | 200 | 200 | 10 |
| Silica Shape | Shape | Spherical | Spherical | Non-spherical | Non-spherical | Spherical | Spherical |
| Silica Particle Diameter | Particle Diameter [nm] | 50 | 30 | 80 | 80 | 30 | 30 |
| Silica Liberation Amount | Liberation Rate A [mass %] | 2.2 | 2.08 | 2.15 | 1.82 | 1.91 | 2.52 |
| Silica Amount | Proportion B [mass %] | 1.5 | 1.5 | 1.5 | 1.5 | 1.5 | 1.5 |
| Evaluation Results | Filming Resistance | B | B | B | A | A | C |
| | Cleanability | C | C | C | C | C | C |

It is clear from the above evaluation results that, in Examples 1 to 7, filming resistance and cleanability are excellent. The filming resistance and cleanability were improved by control of the surface roughness of toner, the particle diameter and shape of inorganic particles.

By contrast, in Comparative Example 1, the shape of silica is spherical, so that the spacer effect is reduced and filming resistance and cleanability are poor.

In Comparative Example 2, the silica is small in particle size and spherical, so that the spacer effect is reduced and filming resistance and cleanability are poor.

In Comparative Example 3, the average surface roughness of the toner is small, so that filming resistance and cleanability are poor.

In Comparative Example 4, the average surface roughness of the toner is large, so that coating efficiency with the external additive is reduced and cleanability is poor.

In Comparative Example 5, the average surface roughness of the toner is large, and the silica is spherical and small in particle size, so that filming resistance and cleanability are poor.

In Comparative Example 6, the average surface roughness of the toner is small, and the silica is spherical and small in particle size, so that filming resistance and cleanability are poor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner comprising:

toner particles each comprising:

a toner base particle comprising a binder resin and a colorant; and an external additive, wherein the toner satisfies the following conditions (a) and (b):

(a) an average surface roughness Ra [nm] of the toner particles, detected by a scanning probe microscope analyzer, satisfies the following formula (1):

$$10<Ra<200 \quad \text{Formula (1); and}$$

(b) the external additive comprises coalesced particles being non-spherical secondary particles in which primary particles are coalesced with each other, the coalesced particles having a number average particle diameter of more than 80 nm and of 200 nm or less; and wherein a liberation rate A [% by mass] of the external additive from the toner particles satisfies the following formula (2):

$$A<2.0 \quad \text{Formula (2),}$$

and wherein the binder resin comprises a crystalline polyester resin, a volume average particle diameter of said toner is from 3 to 7 μm, and a ratio of said volume average particle diameter to a number average particle diameter is 1.2 or less.

2. The toner according to claim 1, wherein the average surface roughness Ra [nm] satisfies the following formula (3):

$$20<Ra<150 \quad \text{Formula (3).}$$

3. The toner according to claim 1, wherein a proportion B [% by mass] of the external additive in the toner satisfies the following formula (4):

$$0.5\leq B\leq 6.0 \quad \text{Formula (4).}$$

4. A developer comprising the toner according to claim 1.

5. A toner accommodating unit comprising:

a container; and the toner according to claim 1 accommodated in the container.

6. An image forming apparatus comprising:

an electrostatic latent image bearer;

an electrostatic latent image forming device configured to form an electrostatic latent image on the electrostatic latent image bearer;

a developing device containing the toner according to claim 1, the developing device configured to develop the electrostatic latent image with the toner to form a visible image;

a transfer device configured to transfer the visible image onto a recording medium; and a fixing device configured to fix the visible image on the recording medium.

7. An image forming method comprising:

forming an electrostatic latent image on an electrostatic latent image bearer;

developing the electrostatic latent image with the toner according to claim 1 to form a visible image;

transferring the visible image onto a recording medium; and fixing the visible image on the recording medium.

8. The toner according to claim 1, wherein the toner does not comprise a magnetic material.

9. The toner according to claim 1, wherein the non-spherical secondary particles comprise non-spherical silica particles.

10. The toner according to claim 1, wherein the non-spherical silica particles are obtained by a sol-gel method.

11. The toner according to claim 1, comprising an amorphous polyester resin in an amount of from 50 to 95 parts by mass per 100 parts by mass of the toner.

12. The toner according to claim 1, comprising the crystalline polyester resin in an amount of from 2 to 20 parts by mass per 100 parts by mass of the toner.

13. The toner according to claim 1, wherein the crystalline polyester resin comprises a saturated straight-chain aliphatic diol having from 2 to 8 carbon atoms in polymerized form.

14. The toner according to claim 1, wherein the crystalline polyester resin comprises sebacic acid in polymerized form.

15. The toner according to claim 1, wherein the crystalline polyester resin has a melting point of from 60° C. to lower than 80° C.

16. The toner according to claim 1, wherein an average value of a degree of coalescence of the coalesced particles is from 2.0 to 3.0.

* * * * *